United States Patent
The et al.

(10) Patent No.: US 9,459,454 B1
(45) Date of Patent: Oct. 4, 2016

(54) INTERACTIVE SOCIAL GAMES ON HEAD-MOUNTABLE DEVICES

(71) Applicant: Google Inc., Mountain View, CA (US)

(72) Inventors: Richard The, New York, NY (US); Jeffrey Paul Baxter, Brooklyn, NY (US); Kjell Fredrik Heghammar, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 14/286,191

(22) Filed: May 23, 2014

(51) Int. Cl.
*A63F 13/00* (2014.01)
*G02B 27/01* (2006.01)
*A63F 13/219* (2014.01)

(52) U.S. Cl.
CPC ............ *G02B 27/017* (2013.01); *A63F 13/04* (2013.01); *G02B 2027/0178* (2013.01)

(58) Field of Classification Search
CPC .... A63F 13/21; A63F 13/211; A63F 13/212; A63F 13/213; A63F 13/215; A63F 13/216; A63F 2300/10; A63F 2300/1012; A63F 2300/105
USPC ..................................................... 463/31, 32
See application file for complete search history.

(56) References Cited

U.S. PATENT DOCUMENTS

| | | | |
|---|---|---|---|
| 2011/0319166 A1 | 12/2011 | Bathiche et al. | |
| 2012/0253489 A1* | 10/2012 | Dugan | A63F 13/10 700/91 |
| 2013/0095924 A1* | 4/2013 | Geisner | A63F 13/00 463/32 |
| 2013/0178257 A1 | 7/2013 | Langseth | |
| 2013/0196757 A1* | 8/2013 | Latta | A63F 13/211 463/31 |
| 2013/0242064 A1 | 9/2013 | Hardy | |
| 2013/0293468 A1 | 11/2013 | Perez et al. | |
| 2014/0002359 A1 | 1/2014 | Weising et al. | |
| 2014/0361977 A1* | 12/2014 | Stafford | G02B 27/0093 345/156 |
| 2014/0364228 A1* | 12/2014 | Rimon | A63F 13/12 463/32 |
| 2014/0375680 A1* | 12/2014 | Ackerman | G06T 19/006 345/633 |
| 2015/0243078 A1* | 8/2015 | Watson | A63F 13/26 345/547 |
| 2015/0302867 A1* | 10/2015 | Tomlin | G10L 25/48 704/270 |

\* cited by examiner

*Primary Examiner* — James S McClellan
(74) *Attorney, Agent, or Firm* — McDonnell Boehnen Hulbert & Berghoff LLP

(57) ABSTRACT

Disclosed herein are embodiments of an interactive social game. In one aspect, a method involves a computing system initiating a game application that provides a game of one or more rounds of gameplay. During each round of gameplay, the method involves the computing system receiving first and second body-movement data corresponding to body movement associated with a first and second HMD, respectively. Based on the first and second body-movement data, the computing system generates: (a) a first competitor data indicating a graphical representation of the body movement associated with the second HMD and (b) a second competitor data indicating a graphical representation of the body movement associated with the first HMD. The computing system then transmits to the first HMD the first competitor data to facilitate display of the graphical representation of the body movement associated with the second HMD by the first HMD.

21 Claims, 32 Drawing Sheets

US 9,459,454 B1

INTERACTIVE SOCIAL GAMES ON HEAD-MOUNTABLE DEVICES

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a graphic display close enough to a wearer's (or user's) eye(s) such that the displayed image appears as a normal-sized image, such as might be displayed on a traditional image display device. The relevant technology may be referred to as "near-eye displays."

Wearable computing devices with near-eye displays may also be referred to as "head-mountable displays" (HMDs), "head-mounted displays," "head-mounted devices," or "head-mountable devices." A head-mountable display places a graphic display or displays close to one or both eyes of a wearer. To generate the images on a display, a computer processing system may be used. Such displays may occupy a wearer's entire field of view, or only occupy part of wearer's field of view. Further, head-mounted displays may vary in size, taking a smaller form such as a glasses-style display or a larger form such as a helmet, for example.

Emerging and anticipated uses of wearable displays include applications in which users interact in real-time with an augmented or virtual reality. Such applications can be mission-critical or safety-critical, such as in a public safety or aviation setting. The applications can also be recreational, such as interactive gaming. Many other applications are also possible.

SUMMARY

Example embodiments may provide for an interactive social game that involves two or more players wearing respective HMDs competing against one another by performing physical activities. In particular, the interactive social game may be carried out by multiple HMDs in communication with a computing system, such as a gaming server. A given HMD may be configured to detect a physical activity performed by a wearer of the HMD (e.g., a player). For example, the HMD may determine a body movement and/or body position performed by the player. The HMD may transmit to the gaming server data reflecting the physical activity performed by the player. The gaming server may in turn process the data and return to the HMD competitor data. The competitor data may cause a graphical display of the HMD to display to the player a graphical representation of the player's competitor's performance of the physical activity. Such a display may occur at substantially the same time as the competitor performs the physical activity. In this way, the player may visualize his or her competitor's game progress in real-time. This visualization may continue until the game comes to an end.

In one aspect, a method may involve initiating, by a computing system, a game application that provides a game comprising one or more rounds of gameplay and during each of the one or more rounds of gameplay: (1) receiving first body-movement data corresponding to body movement associated with a first head-mountable device (HMD), (2) receiving second body-movement data corresponding to body movement associated with a second HMD, (3) based on the first body-movement data and the second body-movement data, the computing system generating: (a) a first competitor data indicating a graphical representation of the body movement associated with the second HMD and (b) a second competitor data indicating a graphical representation of the body movement associated with the first HMD, and (4) transmitting to the first HMD the first competitor data to facilitate display of the graphical representation of the body movement associated with the second HMD by the first HMD.

In another aspect, a computing system may include a network interface, wherein the network interface communicatively couples the computing system to a first head-mountable device (HMD) and a second HMD, a non-transitory computer-readable medium, and program instructions stored on the non-transitory computer-readable medium and executable by at least one processor to cause the computing system to initiate a game application that provides a game comprising one or more rounds of gameplay and during each of the one or more rounds of gameplay: (1) receive first body-movement data corresponding to body movement associated with the first HMD, (2) receive second body-movement data corresponding to body movement associated with a second HMD, (3) based on the first body-movement data and the second body-movement data, generate: (a) a first competitor data indicating a graphical representation of the body movement associated with the second HMD and (b) a second competitor data indicating a graphical representation of the body movement associated with the first HMD, and (4) transmit to the first HMD the first competitor data to facilitate display of the graphical representation of the body movement associated with the second HMD by the first HMD.

In a further aspect, a computing system may include means for initiating a game application that provides a game comprising one or more rounds of gameplay and means for, during each of the one or more rounds of gameplay: (1) receiving first body-movement data corresponding to body movement associated with a first head-mountable device (HMD), (2) receiving second body-movement data corresponding to body movement associated with a second HMD, (3) based on the first body-movement data and the second body-movement data, generating: (a) a first competitor data indicating a graphical representation of the body movement associated with the second HMD and (b) a second competitor data indicating a graphical representation of the body movement associated with the first HMD, and (4) transmitting to the first HMD the first competitor data to facilitate display of the graphical representation of the body movement associated with the second HMD by the first HMD.

In an additional aspect, a method may involve initiating, by a first head-mountable device (HMD), a game application that provides a game comprising one or more rounds of gameplay and during each of the one or more rounds of gameplay: (1) transmitting to a computing system first body-movement data corresponding to body movement associated with the first HMD, (2) receiving competitor data indicating a graphical representation of body movement associated with a second HMD, and (3) based on the received competitor data, causing a graphical display to display the graphical representation of the body movement associated with the second HMD.

In one other aspect, a head-mountable device (HMD) may include a graphical display, a network interface, wherein the network interface communicatively couples the HMD to a computing system, a non-transitory computer-readable medium, and program instructions stored on the non-transitory computer-readable medium and executable by at least one processor to cause the HMD to initiate a game application that provides a game comprising one or more rounds of gameplay and during each of the one or more rounds of gameplay: (1) transmit to the computing system first body-movement data corresponding to body movement associated with the HMD, (2) receive competitor data indicating a graphical representation of body movement associated with an additional HMD, and (3) based on the received competitor data, causing the graphical display to display the graphical representation of the body movement associated with the additional HMD.

In yet another aspect, a head-mountable device (HMD) may include means for initiating a game application that provides a game comprising one or more rounds of gameplay and means for, during each of the one or more rounds of gameplay: (1) transmitting to a computing system first body-movement data corresponding to body movement associated with the HMD, (2) receiving competitor data indicating a graphical representation of body movement associated with an additional HMD, and (3) based on the received competitor data, causing a graphical display to display the graphical representation of the body movement associated with the additional HMD.

These as well as other aspects, advantages, and alternatives will become apparent to those of ordinary skill in the art by reading the following detailed description, with reference where appropriate to the accompanying drawings.

DETAILED DESCRIPTION

Figure 1A:
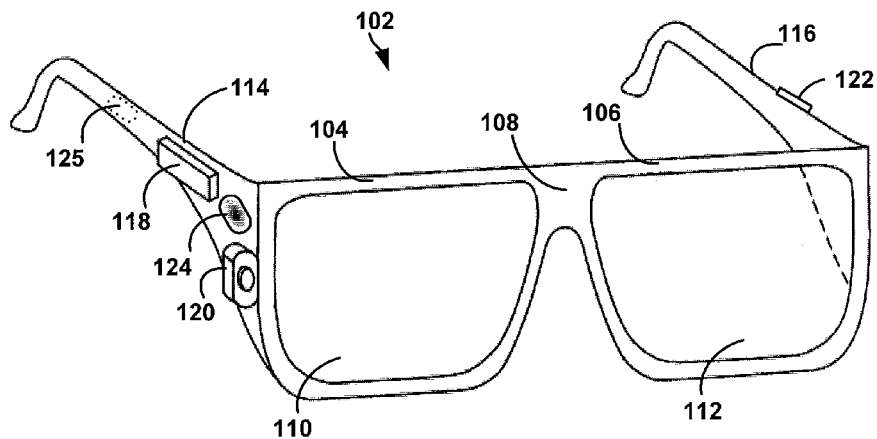
FIG. 1A illustrates a wearable computing system according to an example embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Head-mountable devices (HMDs) may be used for a variety of purposes and in a variety of contexts. For example, a user may use an HMD to play a video game. In conventional gaming systems, a player is tied to the physical location of the gaming system. For example, gaming systems are typically connected with a television that is located indoors. Gaming systems that are portable, such as handheld gaming systems, are generally limited as to what types of player actions they can detect. For example, such gaming systems typically detect a player interaction with an input interface, such as a button or touch screen, or detect a player moving the whole gaming system itself, such as tilting the gaming system.

Example embodiments described herein may provide for an interactive social game played on HMDs. An example interactive social game played via HMDs may be advantageous over games played on conventional gaming systems because players can perform physical activities as part of gameplay from almost anywhere. Further, players may compete against one another in physically active games in real-time, perhaps from different geographical locations. For instance, via an example real-time gaming application, two players in different cities could go to their local high school track, put on their respective HMDs, and compete against one another in track and field events (e.g., a 100 m dash) by actually running the events, in substantially the same way as they would if they were running on the same track. These as well as other advantages will become apparent to one of ordinary skill in the art as the game is described in detail below.

In an example embodiment, an interactive social game may be played by multiple players wearing respective HMDs that are in communication with a computing system, such as a gaming server. The gaming server may interpret physical-activity data that is captured by the HMDs and coordinate the gameplay between the HMDs in real-time. To facilitate such gameplay, each HMD may be configured with various sensors that are capable of determining various body movements and/or positions.

In the above-described arrangement, the gameplay of the interactive social game may progress in the following manner. A first player may use a first HMD to transmit a game request to a gaming server, for example, over a wide-area network (WAN). The game request may identify a second player, corresponding to a second HMD, whom the first player would like to play the game with. The gaming server may receive the game request and contact the second HMD, perhaps by sending the second HMD a game invitation. The second HMD may then send a game acceptance message to the gaming server. The gaming server may then facilitate the start of the interactive social game.

The object of the interactive social game may vary depending on the particular game scenario. A given game scenario may involve each player performing a physical activity that each respective HMD may determine to have been performed based on data from its sensors. The HMD may then send an indication of the detected physical activity or a game input corresponding to the detected physical activity to the gaming server. Alternatively, data from the HMDs' sensors may be sent to the gaming server, which may analyze and interpret the sensor data to determine inputs to the game. In either case, the gaming server may receive data corresponding to these physical activities and may then generate respective competitor data indicating a graphical representation of the physical act performed by a respective player's competitor.

Thereafter, the gaming server may provide respective competitor data to each HMD to facilitate display of the graphical representation of the physical act performed by a player's competitor. In this way, each player may be informed as to the progress of his or her competitor. In example implementations, the competitor data may cause a display of each HMD to display a graphical representation of each respective player's competitor performing a physical activity as that competitor is performing the physical activity in the real-world. Further, the graphical representation may provide a virtual indication of the competitor's progress relative to the player's progress.

Some game scenarios may involve each player performing a single physical action (e.g., jumping one time). Other game scenarios may involve each player performing a prolonged physical activity (e.g., staring without blinking or running a certain distance) or multiple individual actions. In such scenarios, each HMD may continuously provide to the gaming server, in real-time, data reflecting the prolonged physical activity. The gaming server may in turn continuously provide to each HMD, in real-time, competitor data that tracks the progress of each respective player's competitors. Example physical activities may involve staring without blinking, running a specified distance, jumping, spinning, tilting one's head, moving a limb or digit, speaking, holding one's breath, etc.

In an illustrative example, a game scenario may involve a first player using a first HMD and a second player using a second HMD to compete to balance a virtual ball on their head the longest. From the perspective of the first player, before the game starts, the first HMD may display a virtual person corresponding to the first player and a virtual ball on top of the virtual person's head. The gaming server may then transmit a game start message to the first and second HMD that causes each HMD to simultaneously display a graphical representation of a start to the game. For example, the HMDs may simultaneously display a countdown, such as "3, 2, 1, Balance!"

After the countdown, the virtual ball may begin to move and the first player may move his or her head and/or body in an effort to keep the virtual ball on top of the virtual person's head. The first HMD may detect the head and/or body movements and cause the visualization of the virtual person and virtual ball to update accordingly. As the first HMD detects the movements, the first HMD may transmit body-movement data to the gaming server Simultaneously, the gaming server may provide to the first HMD competitor data indicating a graphical representation of the second player attempting to balance a virtual ball as the second player makes movements in the real-world. The first HMD may display the competitor data such that the first player may track the game progress of the second player. For example, the first player may see a virtual person that corresponds to the second player and a virtual ball on top of the second player's virtual head that moves as the second player attempts to balance the ball.

The game may continue until one player's virtual ball falls off the player's virtual head. The gaming server may then generate a game result indicating the winner of the game and transmit the game result to the HMDs. The HMDs may output the game result to the players at substantially the same time.

It should be understood that the above embodiments and others described herein are provided for purposes of illustration, and are not intended to be limiting. Variations on the above embodiments and other embodiments are possible, without departing from the scope of the invention as set forth by the claims.

II. Example Wearable Computing Devices

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer-readable medium, which has program instructions stored thereon that are executable by at a processor to provide the functionality described herein. An example system may also take the form of a device such as a wearable computer or mobile phone, or a subsystem of such a device, which includes such a non-transitory computer-readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is overlaid over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, one or more microphones, one or more proximity sensors, one or more GPS sensors, and/or one or more biometric sensors. Other sensing devices may be included in addition or in the alternative to the sensors that are specifically identified herein.

The finger-operable touch pad 124 is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

Similarly, HMD 102 may interpret certain additional body movements as user input. For example, when HMD 102 is worn, HMD 102 may use one or more gyroscopes, one or more proximity sensors, one or more GPS sensors, one or more accelerometers, and/or one or more biometric sensors to detect body movements. Example body movements may include a user walking/running, jumping, and spinning, among other additional body movements. Furthermore, the HMD 102 may use one or more of these sensors to determine a body or head position or orientation.

As yet another example, HMD 102 may interpret certain gestures (e.g., by a wearer's hand(s) or limb(s)) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

In yet another example, HMD 102 may interpret a user's physiological conditions as user input. For example, HMD 102 may use one or more biometric sensors to detect biometric data, such as heart rate and/or oxygen saturation.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
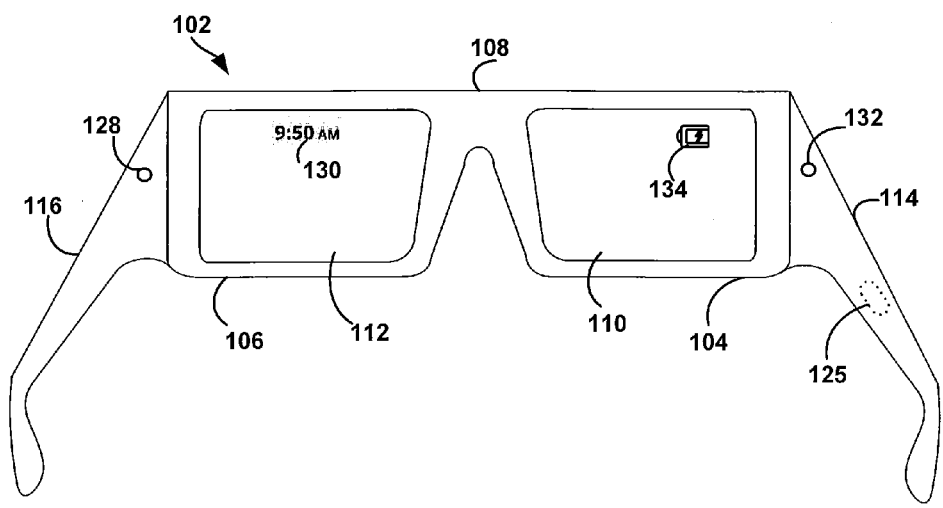
FIG. 1B illustrates an alternate view of the wearable computing device illustrated in FIG. 1A.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

Figure 1C:
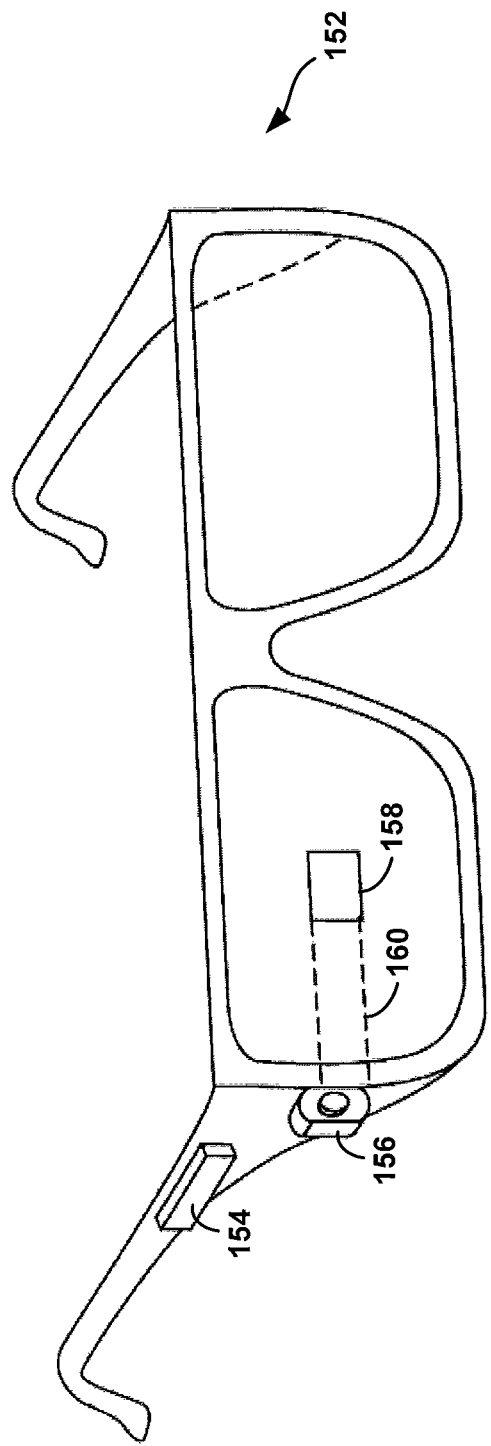
FIG. 1C illustrates another wearable computing system according to an example embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
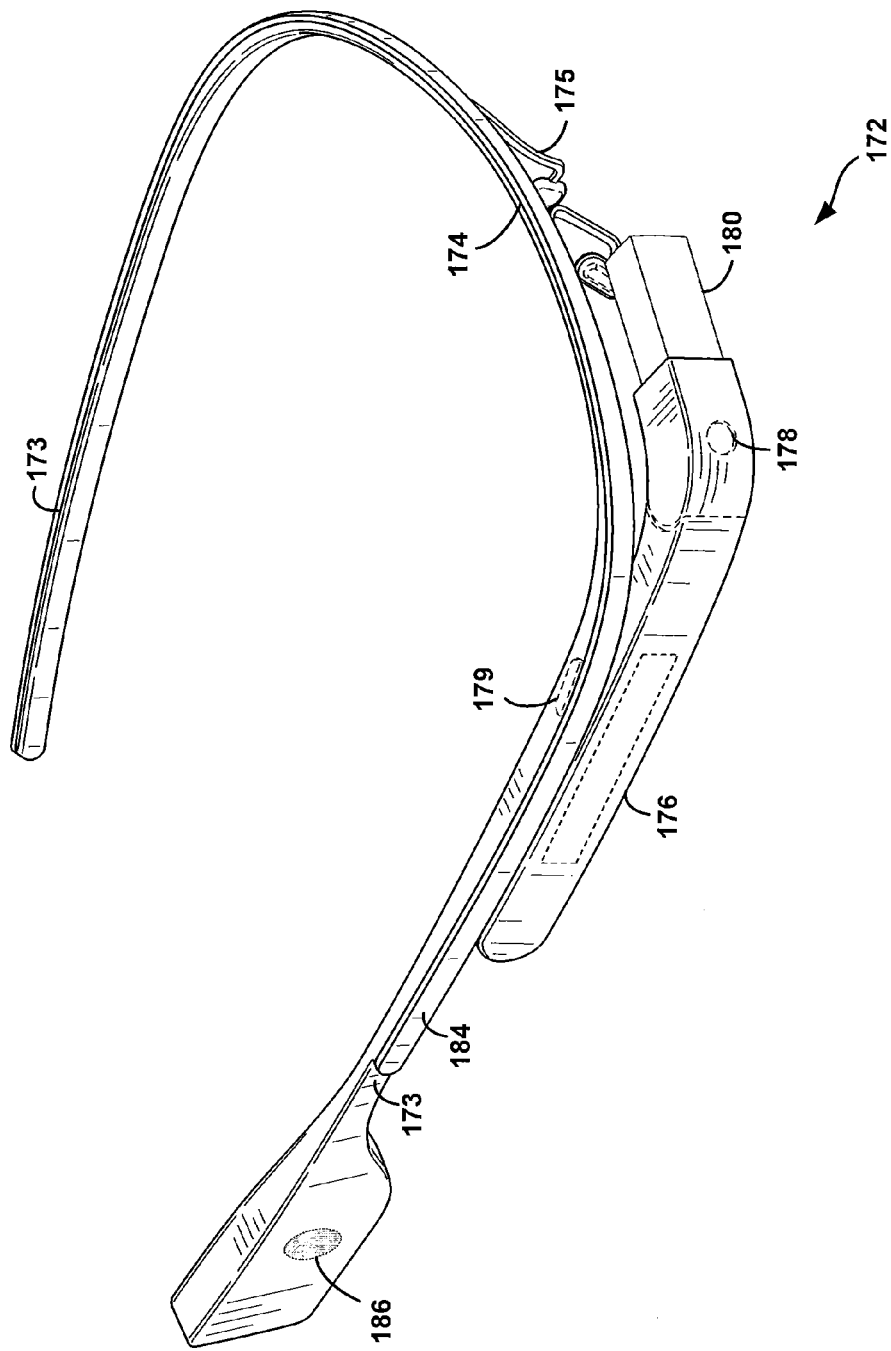
FIG. 1D illustrates another wearable computing system according to an example embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
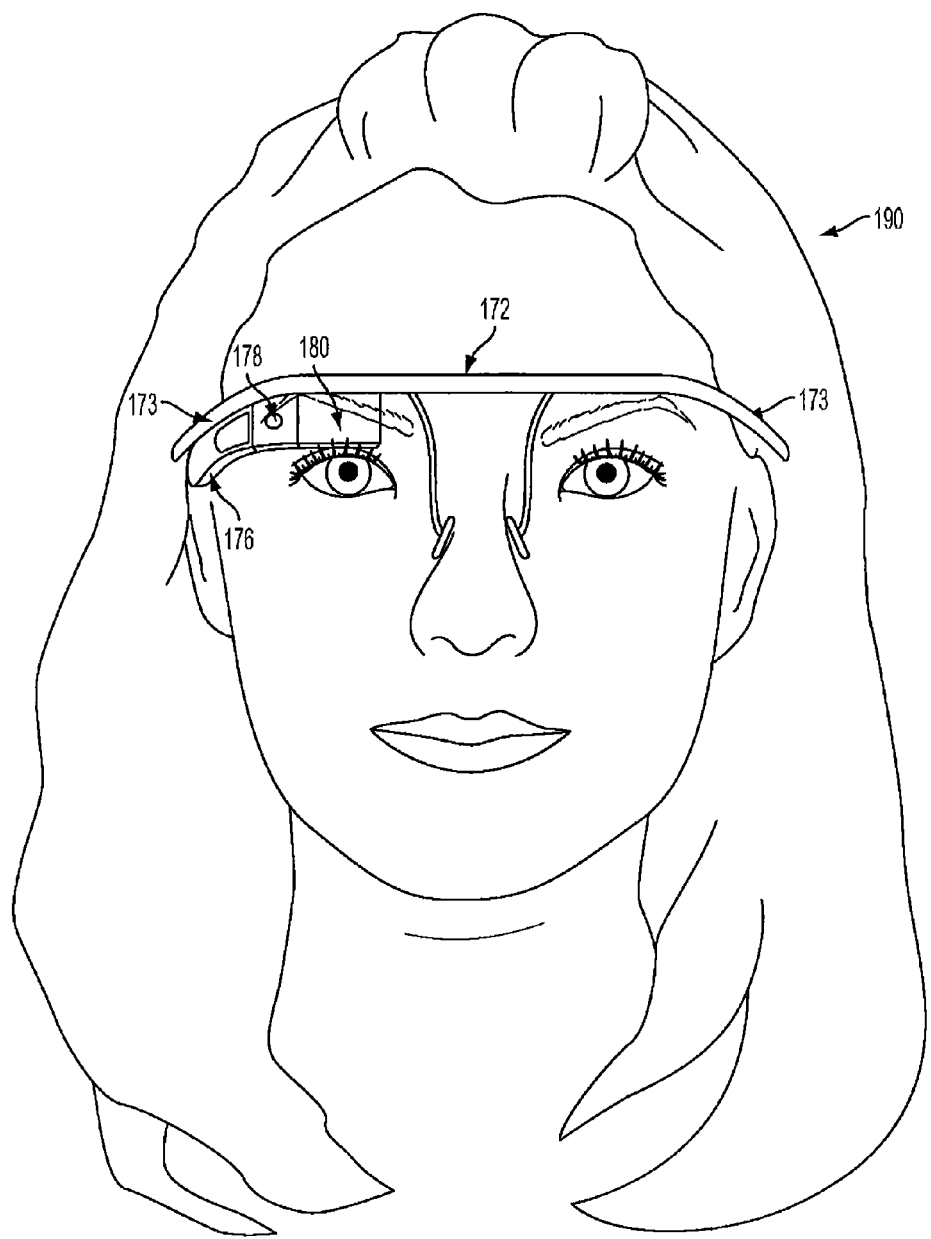
FIGS. 1E to 1G are simplified illustrations of the wearable computing system shown in FIG. 1D, being worn by a wearer.
Figure 1F:
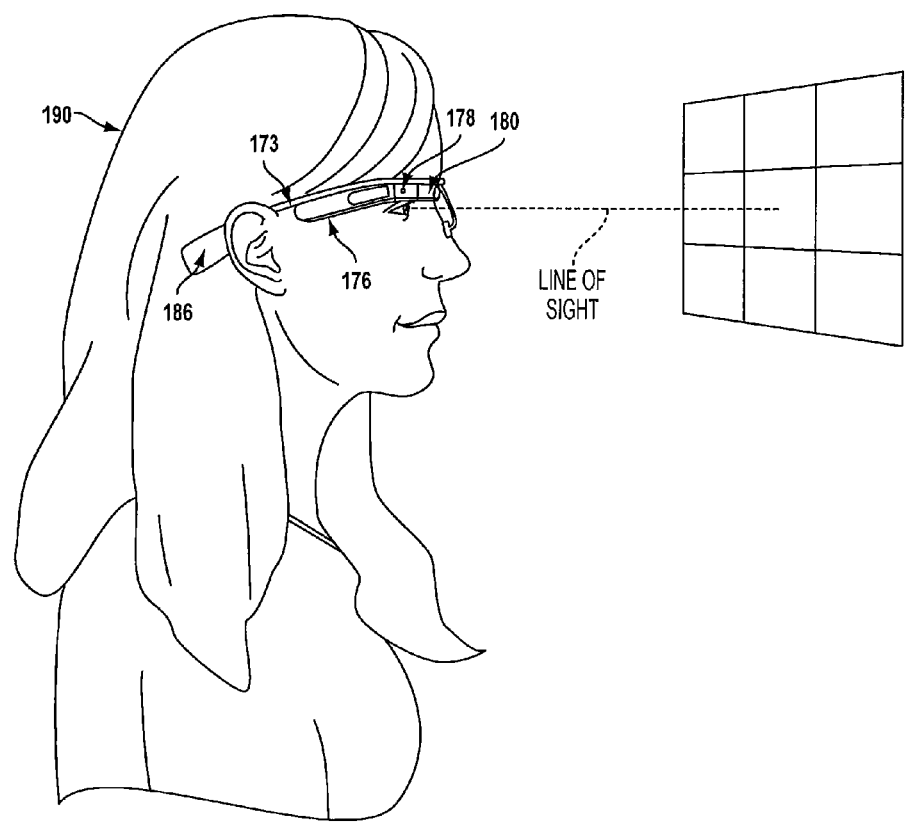
Figure 1G:
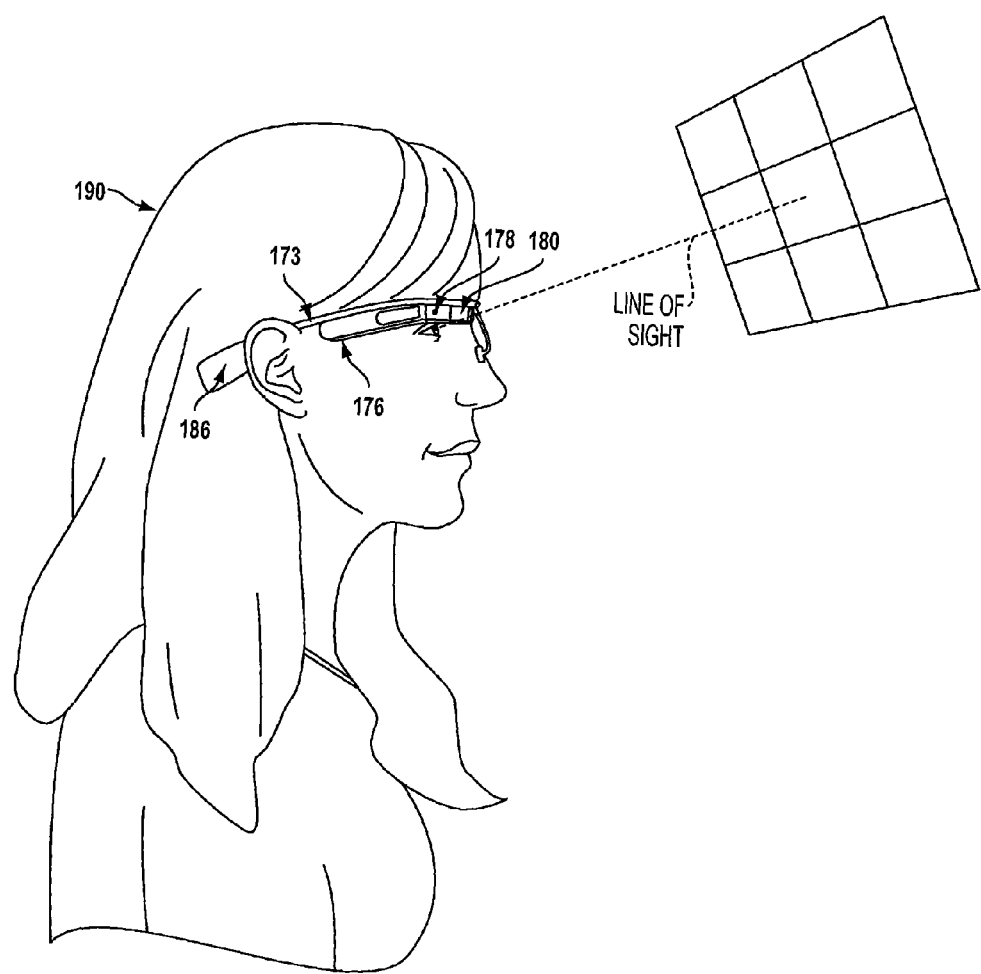

FIGS. 1E to 1G are simplified illustrations of the HMD 172 shown in FIG. 1D, being worn by a wearer 190. As shown in FIG. 1F, when HMD 172 is worn, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer may also use the display by tilting their head down and aligning their eye with the display 180.

Figure 2A:
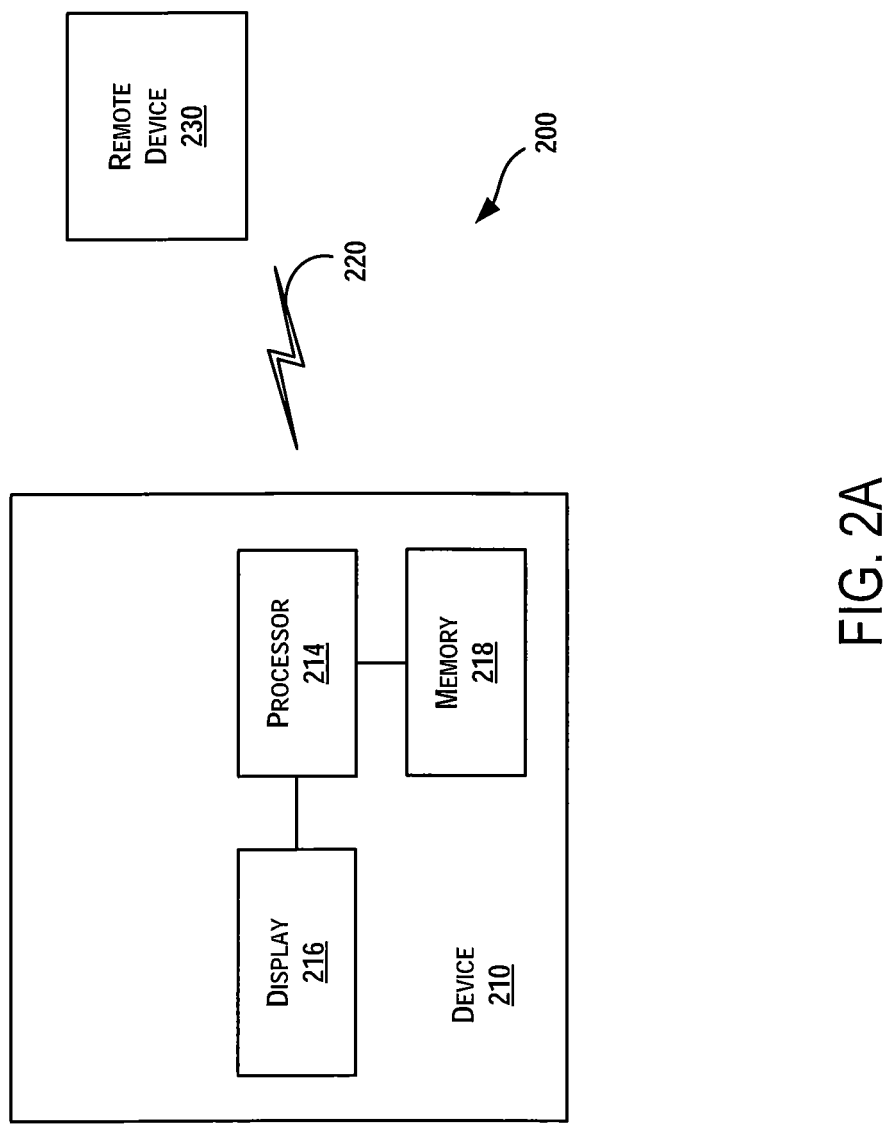
FIG. 2A is a simplified block diagram of a computing device according to an example embodiment.

FIG. 2A is a simplified block diagram a computing device 210 according to an example embodiment. In an example embodiment, device 210 communicates using a communication link 220 (e.g., a wired or wireless connection) to a remote device 230. The device 210 may be any type of device that can receive data and display information corresponding to or associated with the data. For example, the device 210 may take the form of or include a head-mountable display, such as the head-mounted devices 102, 152, or 172 that are described with reference to FIGS. 1A to 1G.

The device 210 may include a processor 214 and a display 216. The display 216 may be, for example, an optical see-through display, an optical see-around display, or a video see-through display. The processor 214 may receive data from the remote device 230, and configure the data for display on the display 216. The processor 214 may be any type of processor, such as a micro-processor or a digital signal processor, for example.

The device 210 may further include on-board data storage, such as memory 218 coupled to the processor 214. The memory 218 may store software that can be accessed and executed by the processor 214, for example.

The remote device 230 may be any type of computing device or transmitter including a laptop computer, a mobile telephone, head-mountable display, tablet computing device, etc., that is configured to transmit data to the device 210. The remote device 230 and the device 210 may contain hardware to enable the communication link 220, such as processors, transmitters, receivers, antennas, etc.

Further, remote device 230 may take the form of or be implemented in a computing system that is in communication with and configured to perform functions on behalf of client device, such as computing device 210. Such a remote device 230 may receive data from another computing device 210 (e.g., an HMD 102, 152, or 172 or a mobile phone), perform certain processing functions on behalf of the device 210, and then send the resulting data back to device 210. This functionality may be referred to as "cloud" computing. Additionally or alternatively, the remote device 230 may receive data from the computing device 210 and transmit that data to another processing device, such as a cloud server, that performs certain processing functions on behalf of the computing device 210 and/or the remote device 230. The remote device 230 may then receive the resulting data from the cloud server and then send such data back to device 210.

In FIG. 2A, the communication link 220 is illustrated as a wireless connection; however, wired connections may also be used. For example, the communication link 220 may be a wired serial bus such as a universal serial bus or a parallel bus. A wired connection may be a proprietary connection as well. The communication link 220 may also be a wireless connection using, e.g., Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities. The remote device 230 may be accessible via the Internet and may include a computing cluster associated with a particular web service (e.g., social-networking, photo sharing, address book, etc.).

III. Example Methods for Interactive Social Games

As discussed above, an HMD may be used to play a game, and in some situations, it may be desirable to play a game that involves performing physical activities and competing against another wearer of an HMD, perhaps in real-time, such as the interactive social game described herein.

Figure 3:
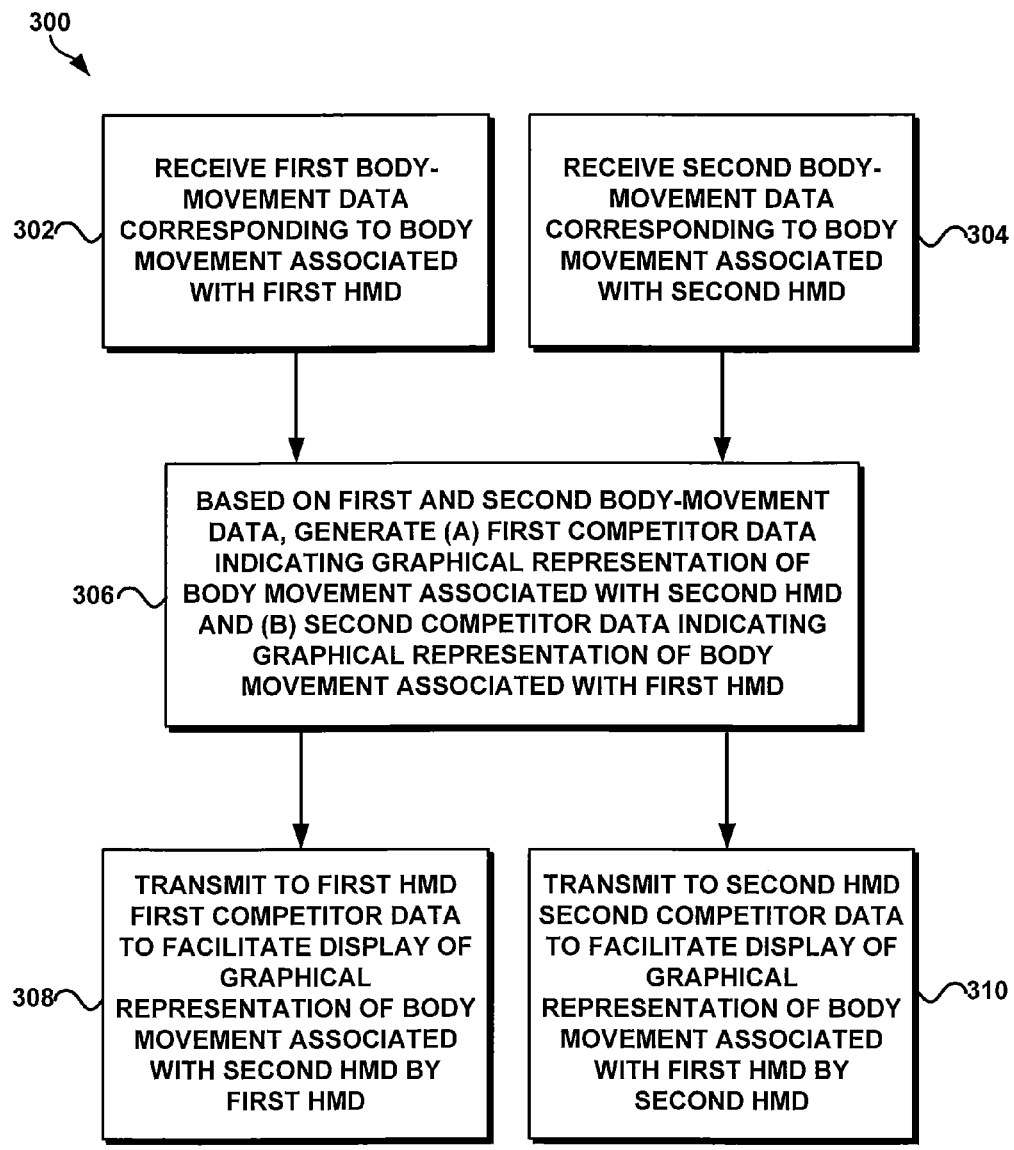
FIG. 3 is a flow chart illustrating a method according to an example embodiment.
Figure 4:
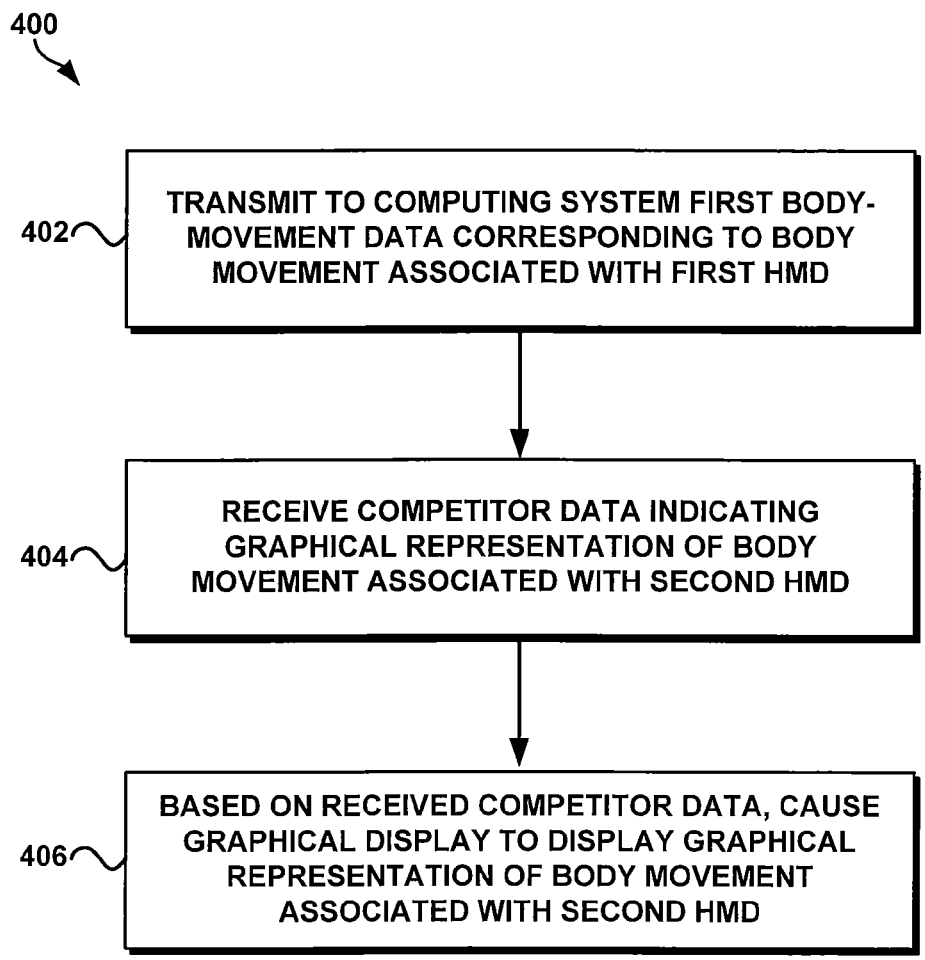
FIG. 4 is a flow chart illustrating another method according to an example embodiment.

FIGS. 3 and 4 are flowcharts that depict example methods for such a game. In particular, the FIGS. 3 and 4 may represent functions that may occur during a round of gameplay of a particular game scenario. The example methods may be carried out in a network configuration where two or more HMDs are in communication with a computing system (e.g., a gaming server) via, for example, a data network, such as a WAN. Notably, each HMD may be located in different geographical locations, and a player may play the game nearly anywhere an HMD is able to obtain a network connection. It should be understood that some or all of the blocks of the methods depicted in FIGS. 3 and 4 may be performed simultaneously and/or sequentially.

Furthermore, those skilled in the art will understand that the flowcharts described herein depict functionality and operation of certain implementations of example embodiments. In this regard, each block of each flowchart may represent a module, a segment, or a portion of program code, which includes one or more instructions executable by a processor for implementing specific logical functions or steps in the process. The program code may be stored on any type of computer-readable medium, e.g., such as a storage device including a disk or hard drive. In addition, each block may represent circuitry that is wired to perform the specific logical functions in the process. Alternative implementations are included within the scope of the example embodiments of the present application in which functions may be executed out of order from that shown or discussed, including substantially concurrent or in reverse order, depending on the functionality involved, as would be understood by those skilled in the art.

1. First Example Method

FIG. 3 illustrates a method 300 according to example embodiments. The method 300 may be carried out by a computing system, such as a gaming server, in communication with a first HMD and a second HMD. Such a gaming server may include, for example, a network interface that communicatively couples the gaming server to the first and second HMDs, a processor, and program instructions stored on a non-transitory computer-readable medium. However, the gaming server may additionally or alternatively include other components. The example method may also be carried out by other types of computing systems and/or combinations of computing systems, without departing from the scope of the invention.

As noted above, the method 300 may represent functions that may occur during a round of gameplay of a particular game scenario. In practice, before a first round of gameplay begins, the gaming server may perform one or more game initiation processes. In particular, such processes may involve the gaming server receiving game-initiation data indicating a request to initiate a game application. Further, the gaming server may cause the game application to initiate a game including one or more rounds of gameplay. Thereafter, the method 300 may be performed to facilitate gameplay of the interactive social game.

During each of the one or more rounds of gameplay, the method 300 involves, at block 302, receiving first body-movement data corresponding to body movement associated with a first HMD. At block 304, the method 300 involves receiving second body-movement data corresponding to body movement associated with a second HMD. At block 306, the method 300 involves based on the first body-movement data and the second body-movement data, the gaming server generating: (a) a first competitor data indicating a graphical representation of the body movement associated with the second HMD and (b) a second competitor data indicating a graphical representation of the body movement associated with the first HMD. At block 308, the method 300 involves transmitting to the first HMD the first competitor data to facilitate display of the graphical representation of the body movement associated with the second HMD by the first HMD. At block 310, the method 300 involves transmitting to the second HMD the second competitor data to facilitate display of the graphical representation of the body movement associated with the first HMD by the second HMD. These functions are discussed in further detail below.

a. Game Initiation

As noted above, before gameplay begins, the gaming server may receive game-initiation data indicating a request to initiate a game application. The gaming server may receive such data from a first HMD via a data network, such as a WAN that includes the Internet and/or one or more cellular networks. In practice, the first HMD may transmit to the gaming server the game-initiation data in response to a first player input indicating a request to play a game.

The game-initiation data may include various information regarding the first player's game request. For example, the game-initiation data may include competitor information and gameplay information. The competitor information may identify one or more players that the first player would like to play against, or the competitor information may indicate that the first player would like to play against a random opponent. The gameplay information may identify a game scenario that the first player would like to play and perhaps gameplay preferences, such as a selected number of rounds of gameplay, difficulty level, etc.

Based on the competitor information, the gaming server may transmit a game invitation to a second HMD (and perhaps other HMDs). The gaming server may then receive from the second HMD a game acceptance message confirming that the second player would like to play against the first player.

Simultaneously or sequentially, the gaming server may identify a game application that corresponds to the first user's desired game scenario based on the gameplay information. In practice, the gaming server may store in memory various game applications that correspond to different game scenarios. Based on the desired game scenario, the gaming server may cause the appropriate game application to initiate a game that involves one or more rounds of gameplay. Thereafter, the gaming server may perform one or more additional functions before gameplay begins.

Depending on the game scenario, before the first round of gameplay, the gaming server may receive respective initialization data indicating respective initial body states associated with the HMDs. To this end, in some examples, the gaming server may send a prompt to the HMDs that instructs the players to remain still before the game begins. The initialization data may indicate the players' respective initial altitudes and/or initial GPS locations. In other examples, the initialization data may indicate the players' respective initial body and/or head positions or orientations. Such data may be used, for example, to create respective virtual "start lines" for the players or to identify starting positions for the players.

Thereafter, the gaming server may transmit game-start data to facilitate substantially simultaneous display of a graphical representation of a start of the game by the first and second HMD. The graphical representation of the start of the game may include a sequence of graphical representations that countdown the start of the game. For example, a sequence of graphical representations may include "3", "2", "1", "Go!", "3", "3, 2", "3, 2, 1", "3, 2, 1, Go!", or the like. Additionally or alternatively, the game-start data may also include an audible indication of a start of the game. As such, both HMDs may simultaneously output, for example, a sound of a starting gun.

In certain game scenarios, such as those where timing is important, the gaming server may perform functions to determine the respective network latency of the HMDs before transmitting game data, such as the game-start data. Based on the determined network latencies, the gaming server may then perform a normalization function so that the first and second HMDs receive game data at substantially the same time, for example, to synchronize the start of the game. For example, the gaming server may determine that the first HMD has a network latency of 30 milliseconds (ms) and the second HMD has a network latency of 230 ms. To normalize the latencies, the gaming server may delay sending the first HMD game data by 200 ms. The gaming server may monitor the respective network latencies throughout gameplay.

b. Receiving First and Second Body-Movement Data

After the gaming server causes the game application to initiate the game, each round of gameplay may involve the method 300 shown in FIG. 3. In particular, at block 302, the method 300 involves receiving first body-movement data corresponding to body movement associated with a first HMD. Simultaneously or sequentially, at block 304, the method 300 involves receiving second body-movement data corresponding to body movement associated with a second HMD.

In practice, the gaming server receiving the first and second body-movement data may involve the gaming server receiving respective real-time body-movement data as it is generated by the first and second HMDs. As used herein, "real-time" refers to a response that occurs almost immediately after the stimuli. Some delay may exist, perhaps from system latency, that may be on the order of milliseconds or perhaps greater or less.

An HMD may generate body-movement data in response to detecting or otherwise determining body movement associated with the HMD. The HMD may determine body movement using one or more sensors of the HMD. The one or more sensors may include image capture devices (e.g., cameras), microphones, accelerometers, gyroscopes, GPS sensors, proximity sensors, biometric sensors, and/or touch sensors, or any combination thereof. Other sensors may also be used.

Body movement associated with the HMD may reflect a physical action or lack of a physical action performed by the player wearing the HMD. For example, certain game scenarios may involve each player performing physical activities, such as running, biking, skiing, jumping, squatting, spinning, speaking, making a hand gesture, moving a limb or digit, tilting one's head, moving one's eye(s), blinking, staring without blinking, holding one's breath, maintaining a particular body position or orientation, or any combination thereof. Accordingly, each HMD may be configured to detect such physical actions or inactions as game inputs. A game scenario may include other types of inputs as game inputs as well. For example, interactions with a touch sensor, voice commands, and/or eye gaze directions, among other examples, may be used as game inputs.

It should be understood that these are but a few examples of body movements associated with an HMD and should not be construed as limiting. Other examples are possible as well.

c. Generating Respective Competitor Data

At block 306, the method 300 involves, based on the first body-movement data and the second body-movement data, the gaming server generating: (a) a first competitor data indicating a graphical representation of the body movement associated with the second HMD and (b) a second competitor data indicating a graphical representation of the body movement associated with the first HMD. In example implementations, the gaming server may generate, in real-time, the first and second competitor data as the respective body-movement data generated by the HMDs is received.

The generated competitor data may indicate a graphical representation of body movement of a player's competitor. That is, the graphical representation may be indicative of physical activity performed by a given player. In this respect, the competitor data may indicate a player's competitor's progress in the given game scenario. A graphical representation of body movement may be indicated by audio, visual, and/or audio visual data. Accordingly, the competitor data may indicate a variety of graphical representations.

In some game scenarios, the graphical representation may indicate a single physical activity. In other game scenarios, the graphical representation may indicate a continuous, prolonged physical activity. For example, where a game scenario involves players attempting to balance a virtual ball on their respective heads, the graphical representation of body movement may indicate a given player tilting his/her head or contorting his/her body to balance the virtual ball. In certain game scenarios, the graphical representation may indicate portion of a physical activity. For example, where a game scenario involves jumping, the graphical representation of body movement may indicate an icon associated with a given player moving vertically and stopping at the peak of the player's jump, but it may not indicate the player's descent. Other examples are also possible. Detailed examples are discussed in further detail below.

A graphical representation of body movement may be based on the particular game scenario. For example, for the same type of body-movement data, the gaming server may generate a first graphical representation for one gaming scenario and a different graphical representation for another gaming scenario.

In some examples, the gaming server generating the respective competitor data may involve the gaming server determining the respective progress of each player in the game based on the first and second body-movement data. The gaming server may then determine respective graphical representations based on the first player's progress relative to the second player's progress and vice versa.

In other examples, determining the relative progress of each player may not be necessary to determine a graphical representation. In such examples, the gaming server may generate the first competitor data based on the second body-movement data, and the second competitor data based on the first body-movement data. Other examples of generating competitor data are also possible.

d. Transmitting Respective Competitor Data

At block 308, the method 300 involves transmitting to the first HMD the first competitor data to facilitate display of the graphical representation of the body movement associated with the second HMD by the first HMD. Similarly, at block 310, the method involves transmitting to the second HMD the second competitor data to facilitate display of the graphical representation of the body movement associated with the first HMD by the second HMD. The gaming server may transmit the respective competitor data to the HMDs via the data network.

In some example implementations, one HMD may not receive competitor data indicating a graphical representation of body movement. For example, a gameplay mode may allow a user to deactivate graphical representations and accordingly, the gaming server may not transmit competitor data to the user's HMD. In such examples, the gaming server may continue to receive body-movement data from the HMD during gameplay and may provide some indication to the HMD when the game is finished. Accordingly, in some implementations, the method 300 may involve the gaming server transmitting competitor data to some HMDs but not to others (e.g., the method 300 may not involve block 310).

In some examples, the gaming server may transmit, in real-time, the respective competitor data as the gaming server generates the respective competitor data. In this way, the HMDs may receive and output respective graphical representations of competitor body movements as the competitor performs such movements and thereby improve each player's game experience.

In example implementations, the gaming server may also transmit to the first and second HMDs game result data indicating a game result. A game result may indicate a current leader of the game (and/or the current round of the game), or the winner of the game, among other examples. For example, a game result may include a score for each player or perhaps a global leader board for a particular game scenario. Other examples are possible as well.

The gaming server may generate the game result data based on the first and second body-movement data. The gaming server may use the first and second body-movement data, along with rules of the gaming scenario, to award the players respective points or determine the winner of the game. Similar to the competitor data, the gaming server may transmit the game result data to the first and second HMDs in real-time. In some examples, the gaming server may generate the game result data based on a comparison of the first and second body-movement data with global leader data that may be stored by the gaming server. Other examples are also possible.

In practice, some game scenarios may involve each player performing a single physical action (e.g., jumping one time). Other game scenarios may involve each player performing a prolonged physical activity (e.g., staring without blinking or running a certain distance) or multiple individual actions (e.g., jumping and spinning). In such scenarios, each HMD may continuously provide, in real-time, the gaming server data reflecting the prolonged physical activity. The gaming server may in turn continuously provide, in real-time, each HMD with competitor data, and perhaps game results, to allow each player to track his/her competitor's progress.

In example implementations, throughout gameplay, the gaming server may perform one or more predictive functions to reduce lag between physical actions occurring in the real-world and the graphical representations of the physical actions. Such predictive functions may be based on the respective network latencies and body-movement data.

For example, the second HMD may have a network latency, and as a result, the graphical representation of the body movement associated with the first HMD displayed at the first HMD may lag behind real-time. To correct this lag, the gaming server may determine from the second body-movement data the speed at which the second HMD is moving, and based on the determined speed and the network latency, the gaming server may predict the location of the second user at a given time. The gaming server may then use this predicted information when providing the first competitor data to the first HMD. In this way, the gaming server may account for the network latency and thereby provide a better real-time experience.

In some implementations, the players may have an option to play a given game scenario in a mode other than the above-described real-time mode. One such other mode may be a "turn-based" gameplay mode. In turn-based gameplay, the first player performs a round of gameplay and then sometime later, the second player performs a round of gameplay. Each player's round of gameplay is then compared to determine a winner. In some examples, the gaming server may provide to each HMD respective competitor data that indicates a status of a given player's competitor. For example, such competitor data may indicate whether a competitor has completed his/her round of gameplay. The competitor data may indicate a graphical representation of the competitor's status. An example graphical representation for a game scenario that involves each player jumping may include a bouncing icon associated with a competitor when that competitor has completed his/her jump. Other examples are also possible.

2. Second Example Method

FIG. 4 illustrates a method 400 according to example embodiments. The method 400 may be carried out in whole or in part by an HMD, such as the head-mountable devices shown in FIGS. 1A to 1G, that is communicatively coupled to a computing system, such as the gaming server described above. In particular, the method 400 may be carried out by components of an HMD, such as a control system. Such a control system may include, for example, a processor and program instructions stored on a non-transitory computer-readable medium, and/or additional or alternative components. Further, the method 400 or portions thereof may be carried out by components of an HMD other than a control system. Yet further, the method 400, or portions thereof, may be carried out by a computing device that is in communication with an HMD. The method 400 may also be carried out by other types of computing devices and/or combinations of computing devices, without departing from the scope of the invention. Other examples of such computing devices include, but are not limited to, other types of wearable computing devices, mobile phones, and tablet computers.

As noted above, the method 400 may represent functions that may occur during a round of gameplay of a particular game scenario. In practice, before gameplay begins, a first HMD may perform one or more game initiation processes. In particular, such processes may involve receiving, by the first HMD, an input to initiate a game application. Further, the first HMD may cause the game application to initiate a game including one or more rounds of gameplay. Thereafter, the method 400 may be performed to facilitate gameplay of the interactive social game.

During each of the one or more rounds of gameplay, the method 400 involves, at block 402, transmitting to a computing system first body-movement data corresponding to body movement associated with the first HMD. At block 404, the method 400 involves receiving competitor data indicating a graphical representation of body movement associated with a second HMD. At block 406, the method 400 involves, based on the received competitor data, causing a graphical display to display the graphical representation of the body movement associated with the second HMD. These functions are discussed in further detail below.

a. Game Initiation

As noted above, before gameplay begins, the first HMD may receive an input to initiate a game application. For example, the first HMD may have an interactive social game application stored in memory. A first player may cause the first HMD to launch such an application via a touch input or voice command, among other inputs. In response to such an input, the first HMD may cause a graphical display (e.g., display 180 of FIG. 1D) to display a listing of one or more game scenarios that the first player may choose from. The first HMD may then receive an input from the first player that identifies a particular game scenario that the player would like to play. In some examples, the first player may also identify a particular opponent(s) that the first player would like to play against and/or particular gameplay preferences.

Thereafter, the first HMD may cause the game application to initiate a game that includes one or more rounds of gameplay. This function may involve the first HMD transmitting game initiation-data to the gaming server, and then receiving game-start data that indicates a graphical representation of a start of the game. The first HMD may then cause the graphical display of the first HMD to display the graphical representation of the start of the game.

In some game scenarios, before the first HMD receives the game-start data, the first HMD may receive initialization request data from the gaming server. Such data may indicate a request for the first player to remain still for a predefined amount of time in order to allow the first HMD to generate initialization data. The initialization data may indicate the first player's starting location, altitude, and/or body orientation, or the like. After the first HMD generates the initialization data, the first HMD may transmit the initialization data to the gaming server to facilitate starting gameplay.

b. Transmitting First Body-Movement Data

After causing the game application to initiate the game, each round of gameplay may involve the method 400 shown in FIG. 4. In particular, at block 402, the method 400 involves transmitting to a computing system first body-movement data corresponding to body movement associated with the first HMD. For example, the first HMD may transmit to the gaming server first body-movement data via the network. The first body-movement data corresponding to body movement associated with the first HMD may be the same as or similar to the body-movement data discussed above.

c. Receiving Competitor Data

At block 404, the method 400 involves receiving competitor data indicating a graphical representation of body movement associated with a second HMD. The first HMD may receive such data from the gaming server, and the second HMD may correspond to the first player's opponent. In the event that the first player has multiple opponents, the first HMD would receive respective competitor data for each opponent or perhaps a single competitor data indicating graphical representations of body movements associated with respective opponents. The competitor data may be the same as or similar to the competitor data discussed above.

d. Causing Graphical Display to Display Graphical Representation of Body Movement At block 406, the method 400 involves, based on the received competitor data, causing a graphical display to display the graphical representation of the body movement associated with the second HMD. For example, the first HMD may cause the display 180 to display the graphical representation of the body movement associated with the second HMD. Detailed examples of graphical representations are discussed below. In any event, the first HMD may cause the graphical display to display the graphical representation of the body movement associated with the second HMD in real-time as the second player is performing a physical action or inaction at the second HMD. In example implementations, the first HMD may display such graphical representations continuously throughout gameplay. The first HMD may also receive game-result data from the gaming server and display game results. Such data may be the same as or similar to that discussed above.

In practice, the first HMD may also cause the graphical display to display a graphical representation of the body movement associated with the first HMD. The graphical representation of the body movement associated with the first HMD may be displayed simultaneously with the graphical representation of the body movement associated with the second HMD. In this way, a given player may receive graphical game feedback of his/her own game progress alongside a graphical representation of their competitor's game progress. Consequently, players located in different geographical locations may compete against one another in performing physical activities and receive visualizations that give the impression that the two players are competing side-by-side, face-to-face, or otherwise about the same location.

IV. Example Game Scenarios

As noted above, the interactive social game described herein may involve HMDs displaying graphical representations of body movements associated with physical actions or inactions performed by a competitor. Such graphical representations may be dependent on the particular game scenario that is being played. In some examples, the graphical representations may include graphical representations of body movements associated with the second HMD as well as graphical representations of body movements associated with the first HMD. The below examples illustrate graphical representations that may be displayed to the first player by the first HMD. It should be understood that the second HMD may simultaneously display to the second player similar graphical representations. Furthermore, while the game scenarios are described as involving a certain number of players, it should be understood that the game scenarios may involve additional or fewer players as well.

The example game displays discussed in detail below may be displayed to the first player via a graphical display of the first HMD (e.g., display 180). A given game display may be displayed to the first player such that the game display is outside of the central portion of the wearer's field of view when the first player's eyes are facing forward. Such positioning may facilitate unobstructed viewing and perception of the world within the central portion of the first player's field of view as the first player is performing a physical activity. In this respect, the first player may experience a virtual world defined by an interactive social game and at the same time, experience his or her real-world surroundings.

Accordingly, the example game displays are shown overlaid over a real-world view as perceived by the first player through the first HMD. To differentiate between real-world objects and game graphics, real-world objects that are overlaid with a game display are outlined in dotted lines. In practice, a game display may be displayed in a variety of manners to help allow the player to differentiate between virtual and real-world objects.

1. Jump Off Game Scenario

An example game scenario may involve players competing to jump the highest. In this game scenario, the first HMD may be configured to detect the player jumping as a game input. This game scenario may involve one physical action (e.g., a single jump by each player).

Figure 5A:
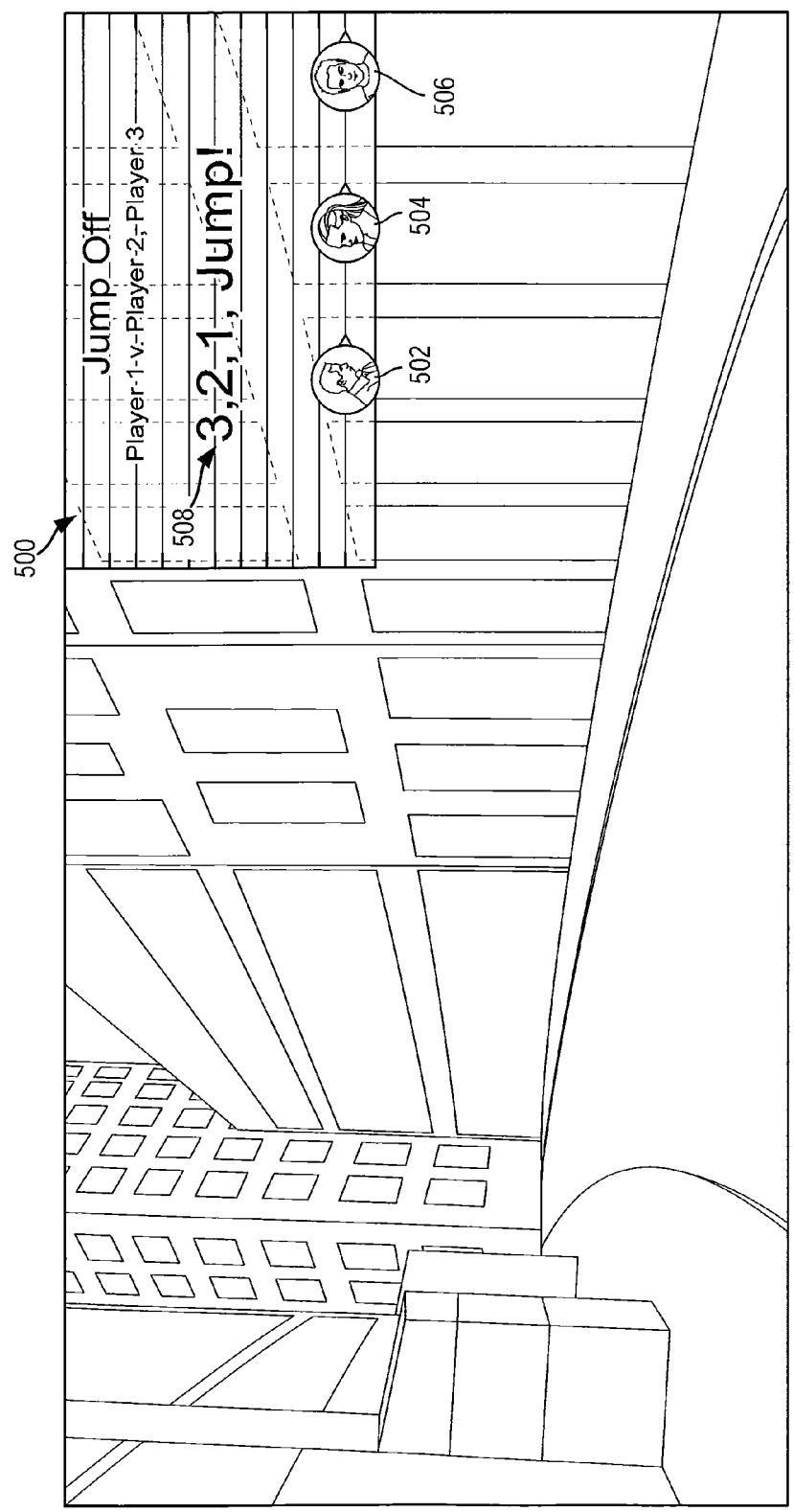
FIG. 5A illustrates an example of a game display displayed to the first player immediately before the players are to jump.

FIG. 5A illustrates an example of a game display 500 displayed to the first player immediately before the players are to jump. As shown, the game display 500 includes a title of the game, as well as other game information, and respective player indicators 502, 504, and 506 that correspond to player 1, player 2, and player 3, respectively. Further, the game display 500 includes a game start graphic 508 that may represent the last of a sequence of graphics that may have been displayed to the first player. For example, the game start graphic 508 may indicate the last graphic in a sequence of countdown graphics displayed to the first player. In particular, the previous countdown graphics may have displayed "3", "3, 2", "3, 2, 1". Other examples are also possible. It should be understood that such a sequence of graphics may be displayed to the first player in a continuous manner.

Figure 5B:
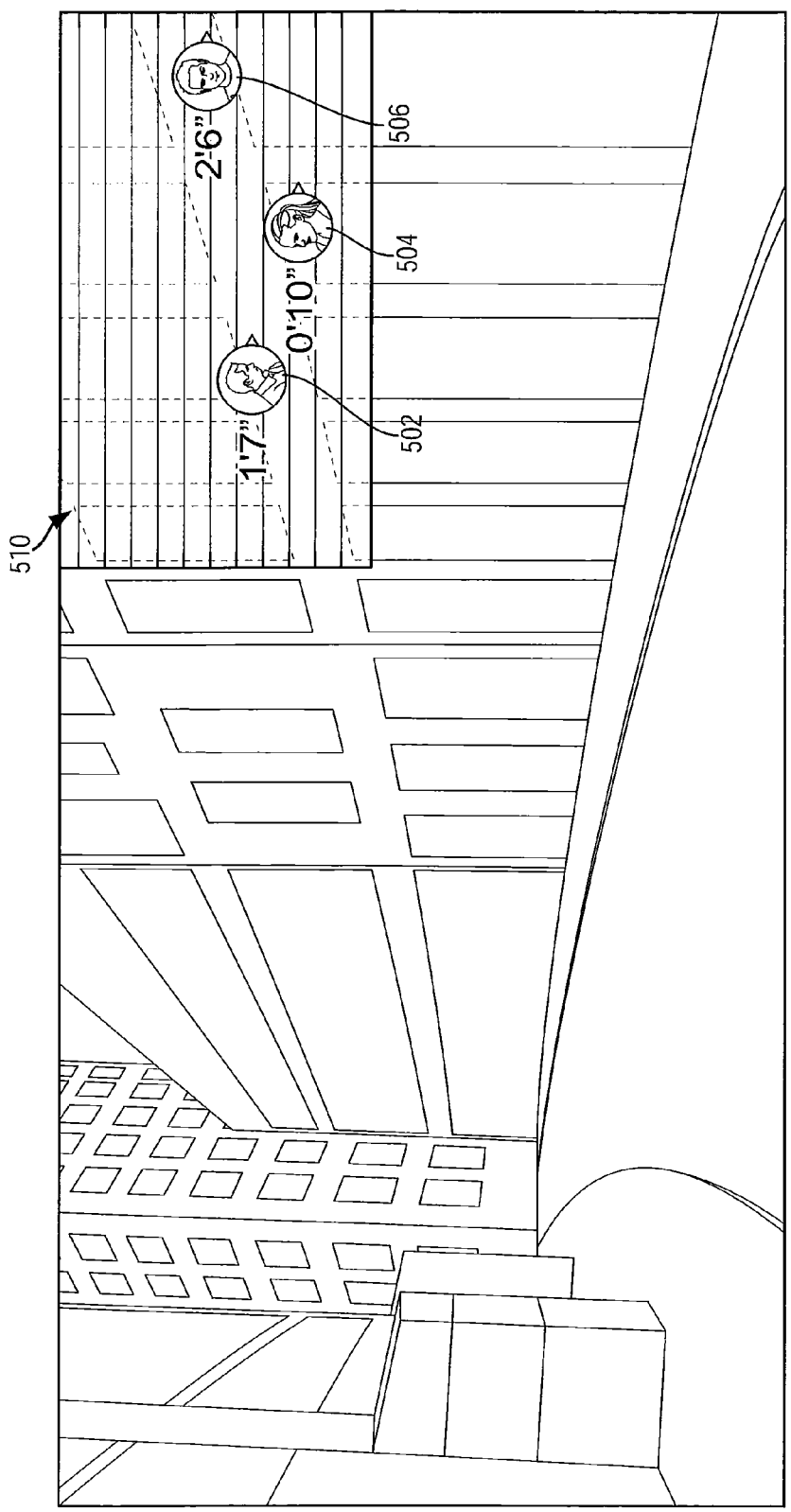
FIG. 5B illustrates an example of a game display displayed to the first player as the players are jumping.

FIG. 5B illustrates an example of a game display 510 displayed to the first player as the players are jumping. As shown, the game display 510 includes the player indicators 502-506 shown in different vertical positions than in FIG. 5A. Further, each player indicator 502-506 includes an indication of the current height of the respective player's jump (in feet and inches). In this way, the first player is provided a graphical indication of his/her own jump relative to the other players' jumps, as the jumps occur.

Figure 5C:
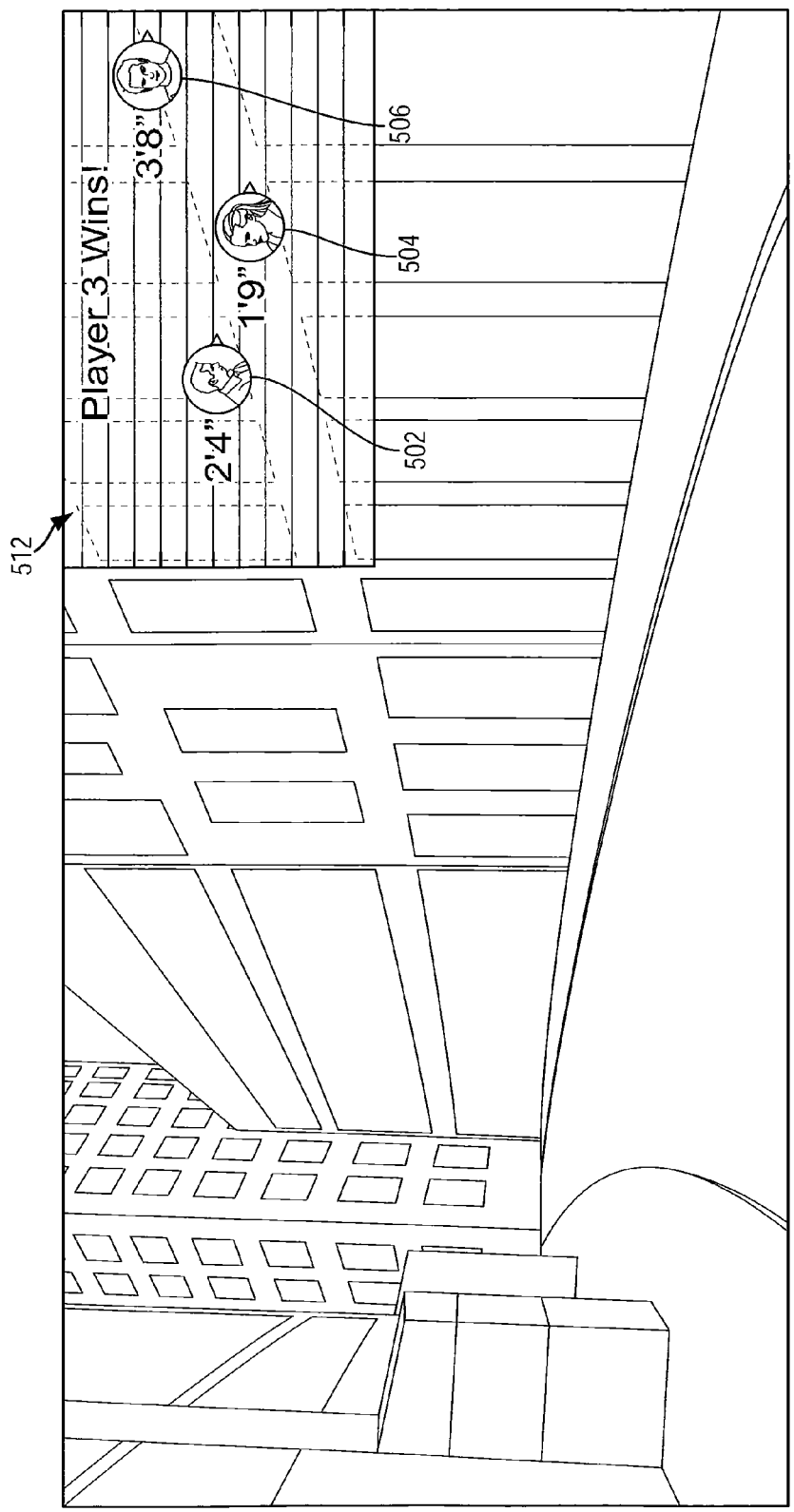
FIG. 5C illustrates an example of a game display displayed to the first player at the conclusion of the round of gameplay.

FIG. 5C illustrates an example of a game display 512 displayed to the first player at the conclusion of the round of gameplay. It should be understood that the first player may see a continuous game display throughout the round of gameplay. As shown, the game display 512 includes the player indicators 502-506 at the peak of each player's respective jump as well as an indication of the winner of the round of gameplay. In some implementations, before the game display 512 is displayed to the first player, a game display of the second and third player reaching the peak of their respective jumps and then descending may also be displayed to the first player. Other example game displays and/or graphics are possible as well.

2. Ball Balancing Game Scenario

Another example game scenario may involve players competing to balance a virtual ball on their respective heads the longest. In this game scenario, the first HMD may be configured to detect a head movement and/or head orientation as a game input. This game scenario may involve the first player performing a prolonged physical activity (e.g., tilting his/her head and/or body in an attempt to balance a virtual ball).

Figure 6A:
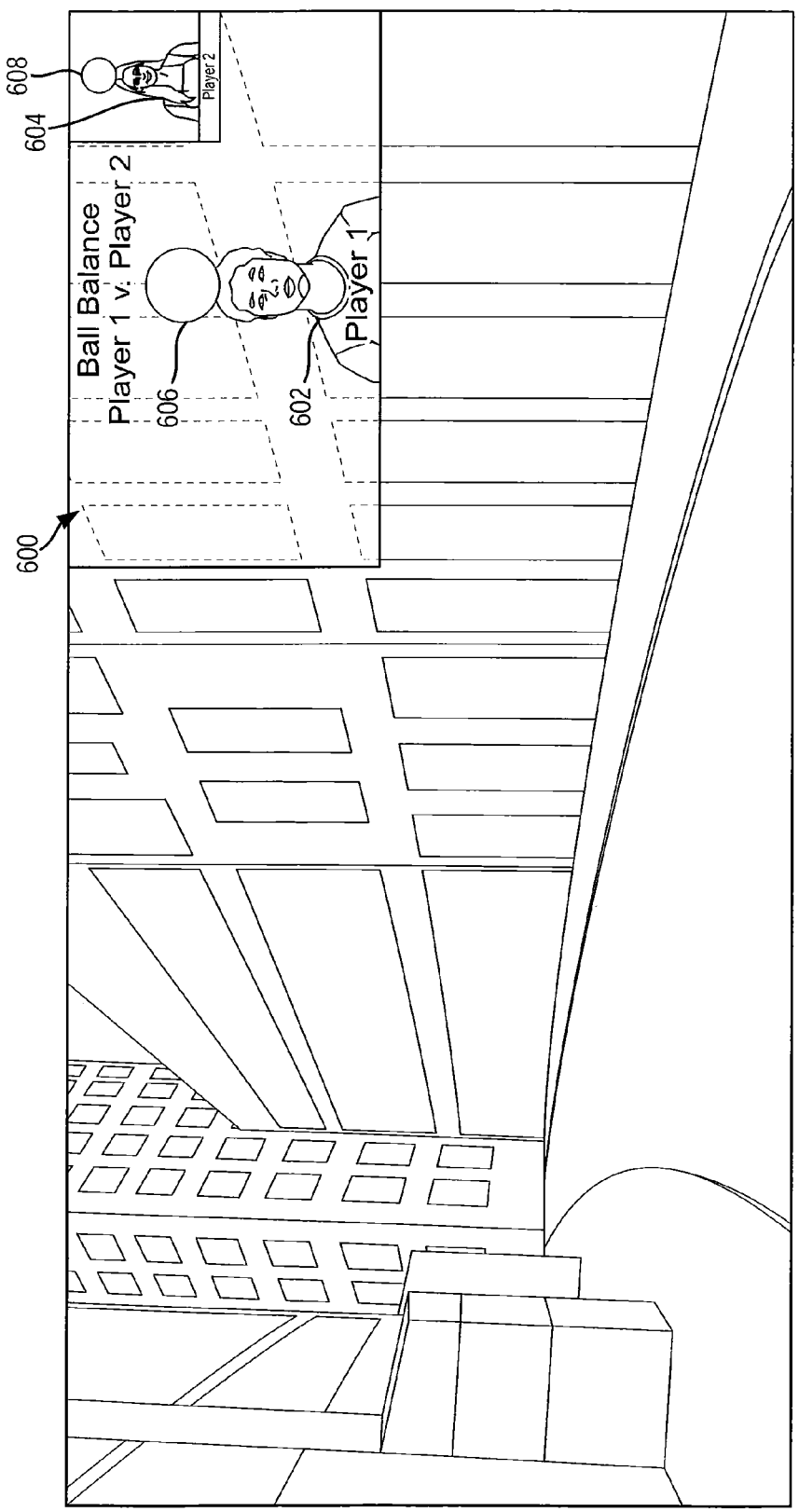
FIG. 6A illustrates an example of a game display displayed to the first player before a round of ball balancing begins.

FIG. 6A illustrates an example of a game display 600 displayed to the first player before a round of ball balance begins. As shown, the game display 600 includes a first virtual player 602 corresponding to the first player, a second virtual player 604 corresponding to the second player, a first virtual ball 606, and a second virtual ball 608. The first and second virtual players 602, 604 may be graphical representations of the real-world upper bodies of the first and second player, respectively, as the gaming server acquires initialization data from the first and second HMDs.

Figure 6B:
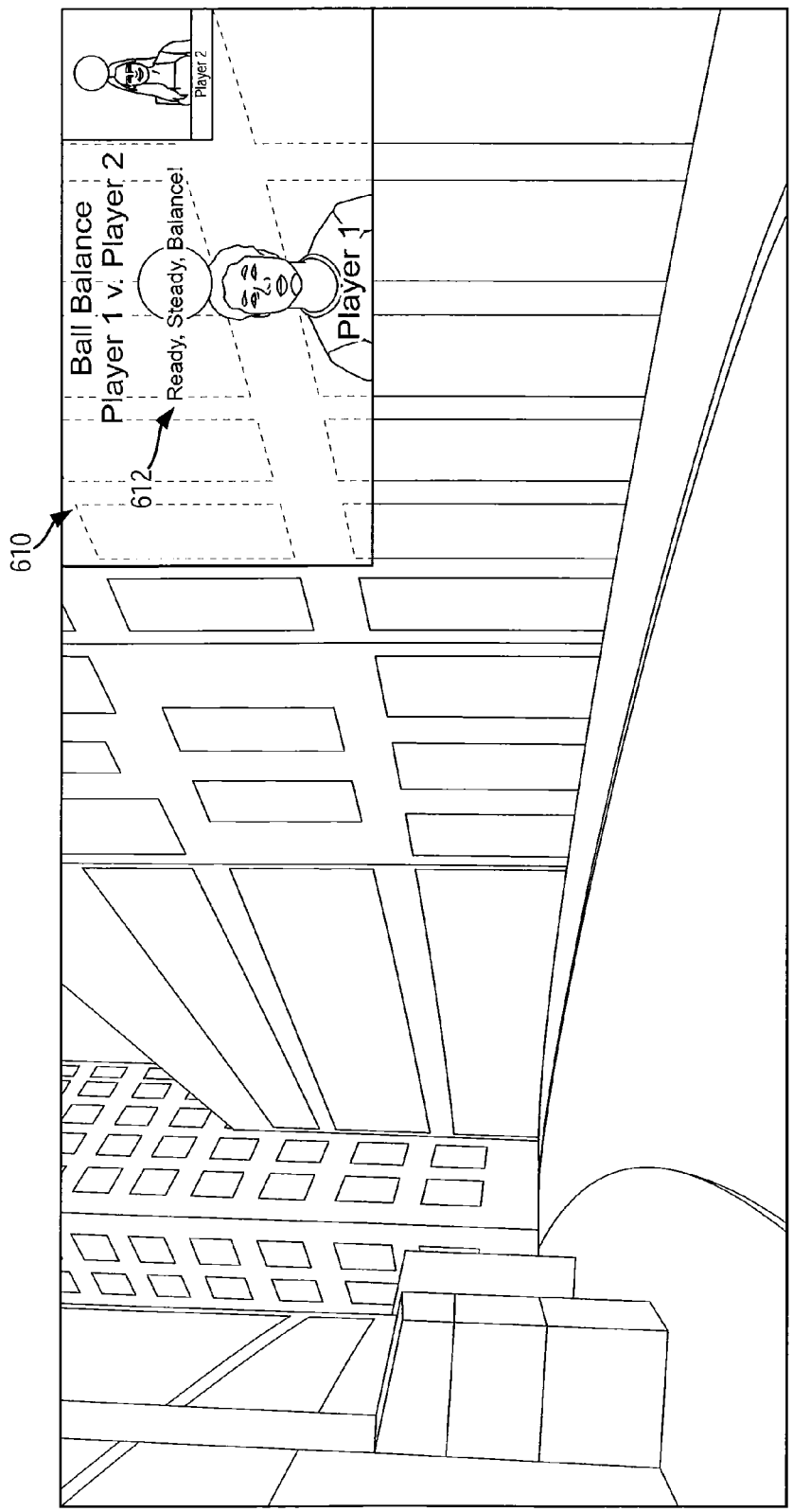
FIG. 6B illustrates an example of a game display displayed to the first player immediately before the players are to balance respective virtual balls.

FIG. 6B illustrates an example of a game display 610 displayed to the first player immediately before the players are to balance respective virtual balls. As shown, the game display 610 includes a game start graphic 612. Other game start graphics are possible as well.

Figure 6C:
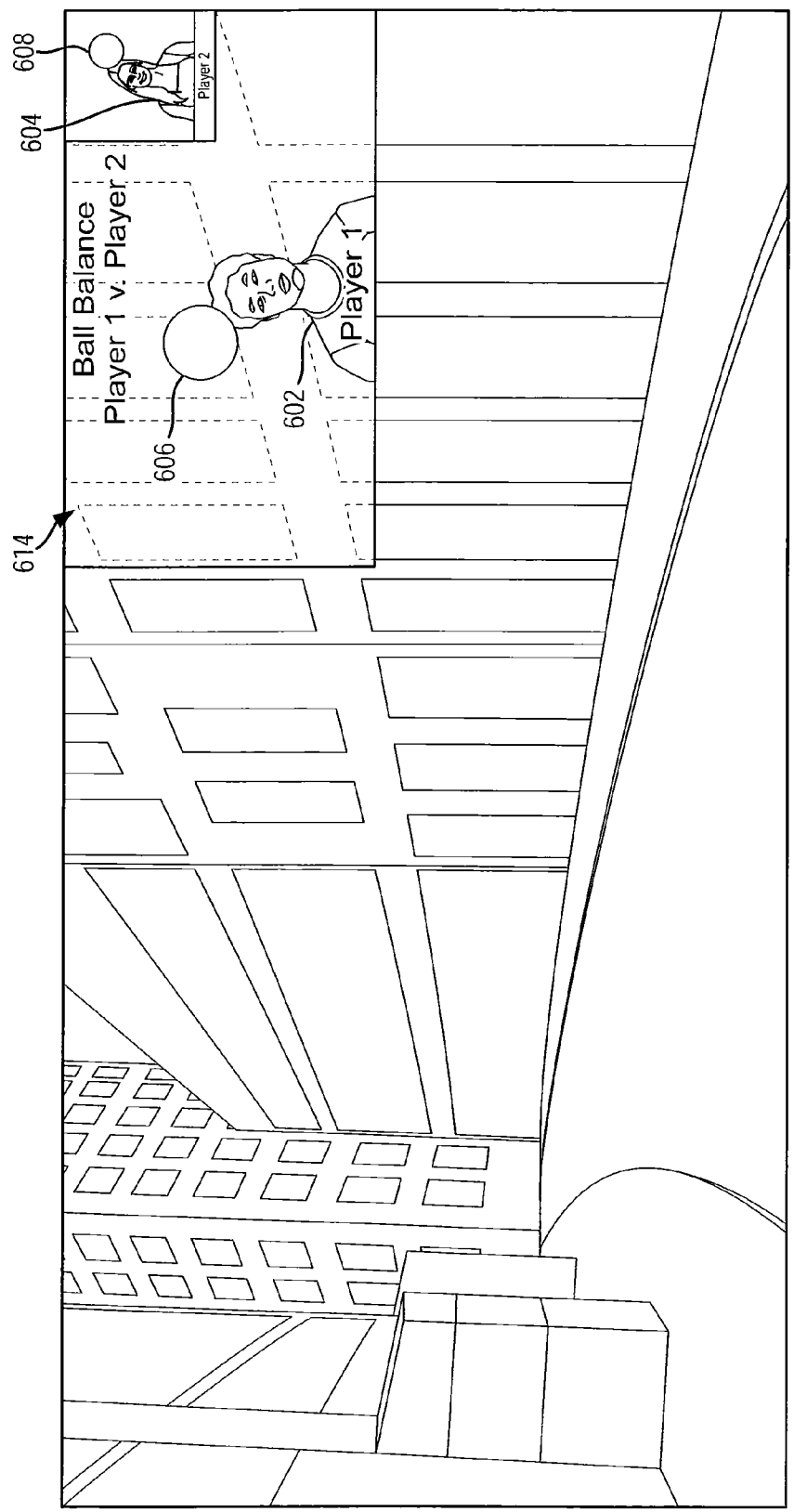
FIG. 6C illustrates an example of a game display displayed to the first player as the players attempt to balance respective virtual balls.

FIG. 6C illustrates an example of a game display 614 displayed to the first player as the players attempt to balance respective virtual balls. As shown, the first virtual player 602 provides a graphical representation of the first player as he/she attempts to balance the virtual ball 606. Notably, the first virtual player 602 mimics the head and/or body movements made by the first player as the first player makes such movements. Similarly, the second virtual player 604 provides to the first player a graphical representation of the second player as he/she attempts to balance the virtual ball 608. The first and second virtual players 602, 604 may continue to move along with the real-world movements of the first and second players, respectively until one of the virtual balls 606, 608 falls to the ground.

In some examples, a timer may also be displayed to the first player as he/she maintains the virtual ball 606 on the virtual player's head. The gaming server or first HMD may maintain a personal record indicating the first player's longest balance and during gameplay, the first HMD may display an indication that the first player is approaching or has exceeded his/her personal record.

As described, this game scenario involves each player interacting with a virtual object by performing real-world physical actions. In this way, the players may experience both a classic video game experience of interacting with virtual objects as well as an exercise-like experience of performing physical actions.

3. Track Star Game Scenario

In an additional example game scenario, players may compete to run a predefined distance in the fastest time. In practice, an HMD may transmit game data to the gaming server that identifies the predefined distance that the player's would like to run (e.g., 1 mile, 5 kilometers, half marathon, marathon, etc.). In this game scenario, the first HMD may be configured to detect a change in the first player's geographical location as a game input. This game scenario may involve the first player performing a prolonged physical activity (e.g., running a certain distance). Notably, this game scenario allows players to compete in running against a remote opponent and does not require that the players run the same track or route. Accordingly, a player in Chicago may run a mile long route along the shoreline of Lake Michigan, while a player in California runs a mile long route along the shoreline of the Pacific Ocean.

Figure 7A:
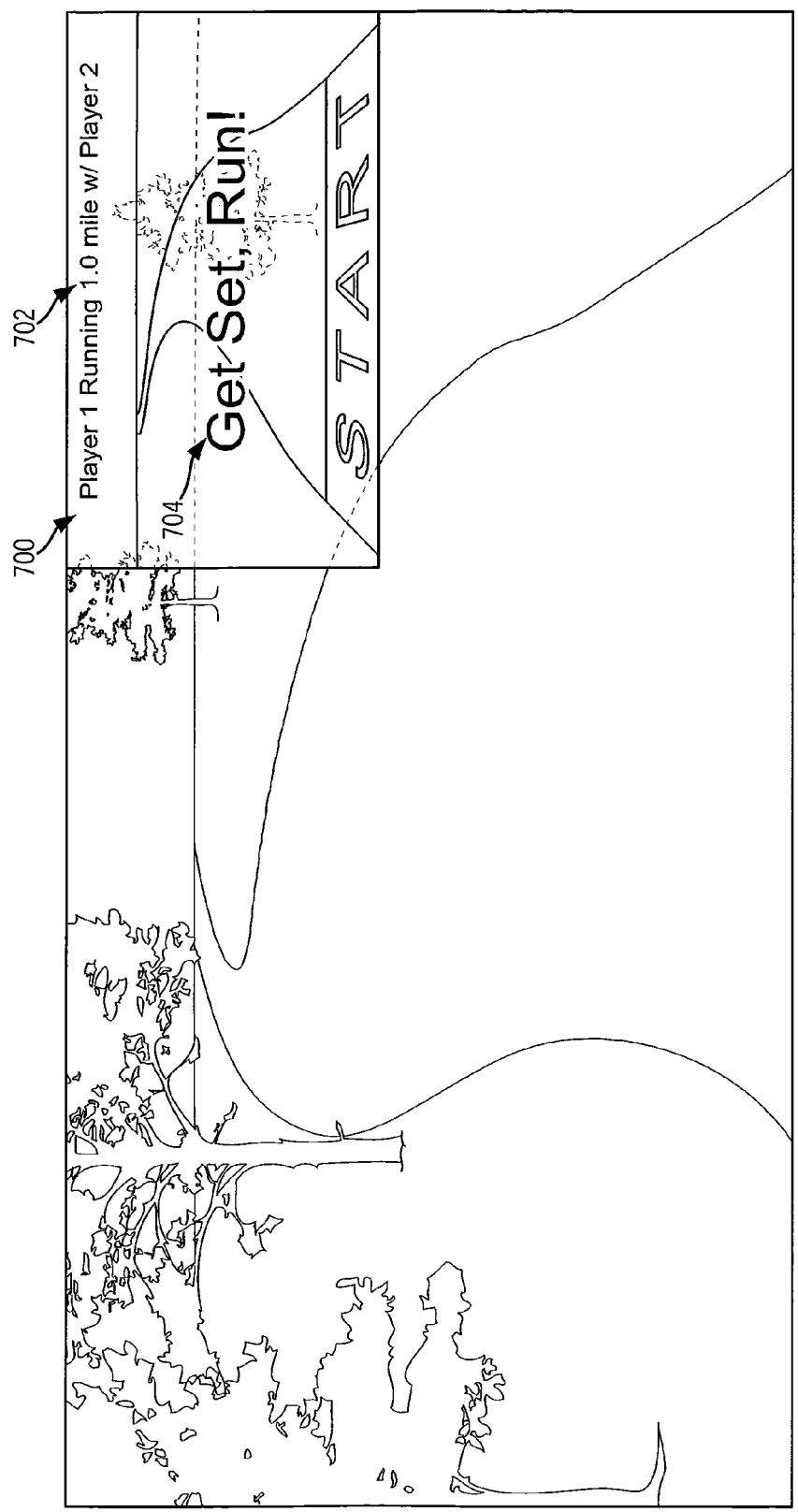
FIG. 7A illustrates an example of a game display displayed to the first player immediately before the players are to begin running.

FIG. 7A illustrates an example of a game display 700 displayed to the first player immediately before the players are to begin running. As shown, the game display 700 includes an indication of a path distance 702 and a game start graphic 704. Notably, as the game start graphic 704 is displayed to the first player (and simultaneously to the second player), the first HMD may also output a sound resembling a starting gun being fired.

Figure 7B:
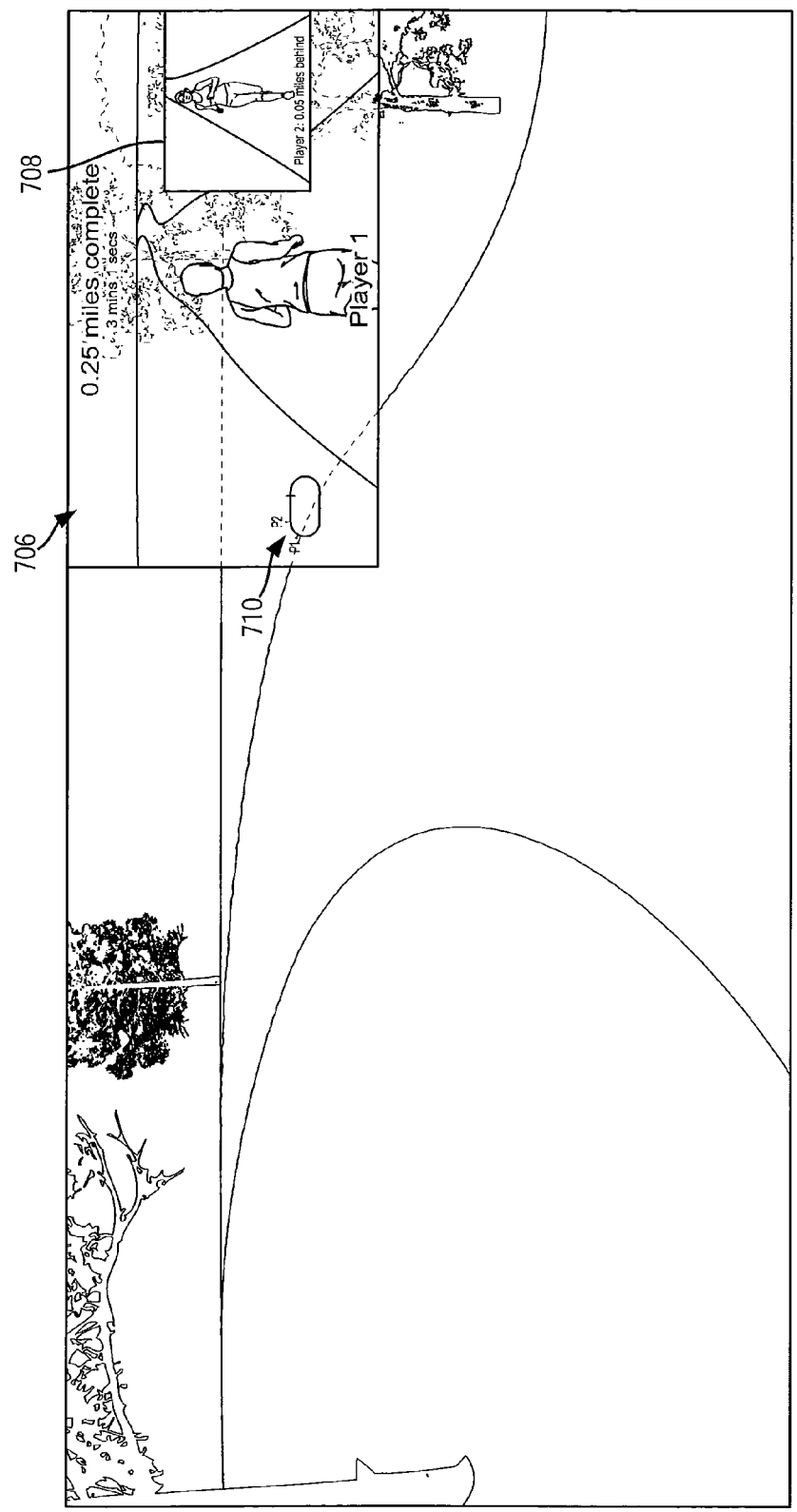
FIG. 7B illustrates an example of a game display displayed to the first player as the players are running and the first player is in the lead.

FIG. 7B illustrates an example of a game display 706 displayed to the first player as the players are running and the first player is in the lead. As shown, the game display 706 includes a game graphic 708 indicating that the first player is ahead of the second player (e.g., the game graphic 708 appears like a rear-view mirror when the first player is in the lead). The game display 706 also includes a game graphic 710 that indicates the first and second player's respective progresses in completing the predefined distance run. In this respect, the first player is able to view how far he/she has run, how far he/she has left to run, as well as where the second player is relative to him/her.

Figure 7C:
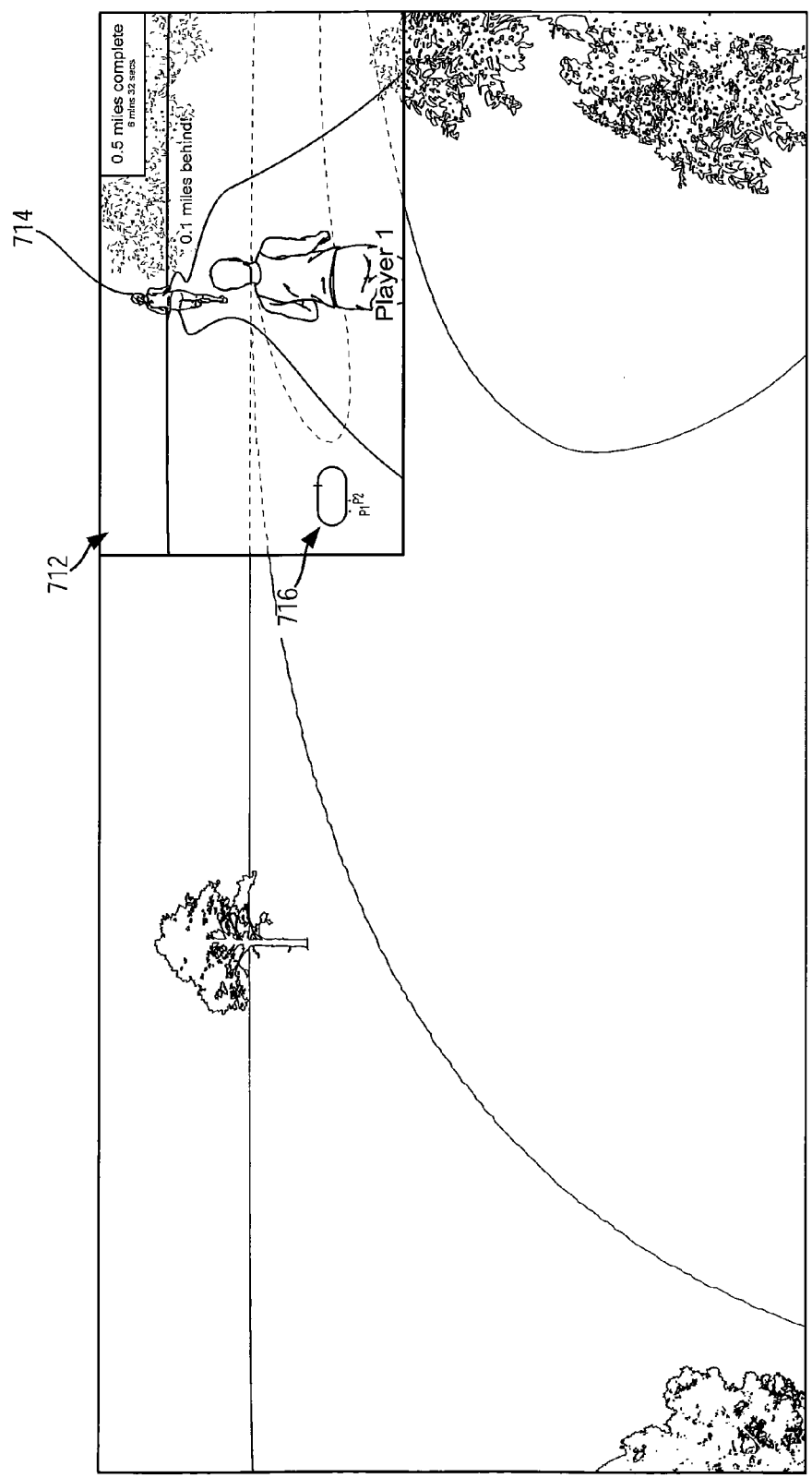
FIG. 7C illustrates an example of a game display displayed to the first player as the players are running and the second player is in the lead.

FIG. 7C illustrates an example of a game display 712 displayed to the first player as the players are running and the second player is in the lead. As shown, the game display 712 includes a game graphic 714 indicating that the second player is ahead of the first player (e.g., the game graphic 714 provides the impression that the first player is chasing the second player). The game display 712 also includes a game graphic 716 that is similar to the game graphic 710 of FIG. 7B but includes updated progress of each player.

Figure 7D:
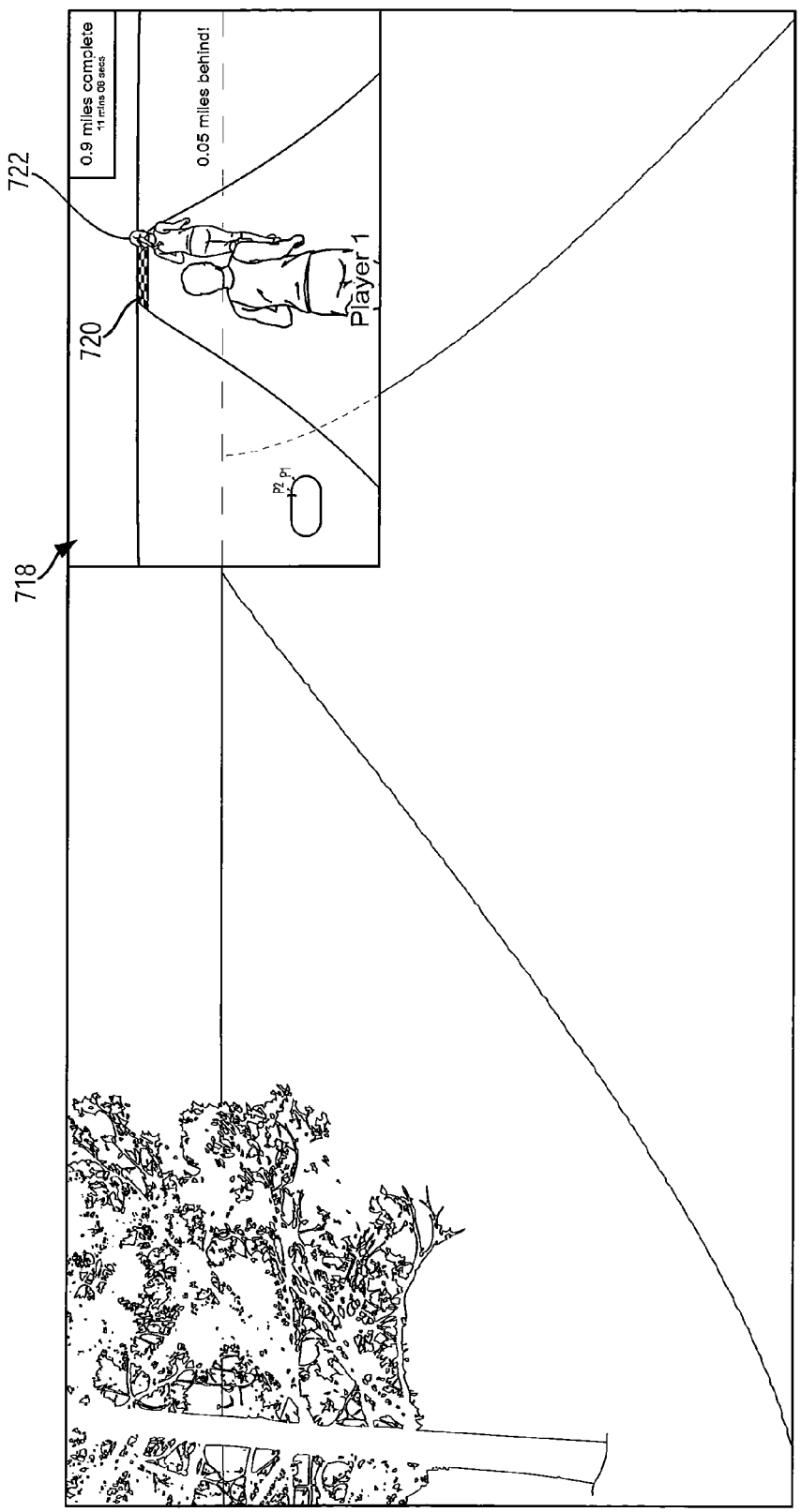
FIG. 7D illustrates an example of a game display displayed to the first player as the players approach the end of the run

FIG. 7D illustrates an example of a game display 718 displayed to the first player as the players approach the end of the run. As shown, the game display 718 includes a game graphic 720 that resembles a virtual finish line and a game graphic 722 that is similar in some respects to the game graphic 714 of FIG. 7C except in the game graphic 722 the virtual second player appears larger than in the game graphic 714. This change in size of the virtual second player may indicate that the first player decreased the lead that the second player had at the point in time depicted in FIG. 7C.

As the first player nears the end of the run, a game display may continue to be displayed to the first player that includes a game graphic similar to the game graphic 720, but the virtual finish line may gradually grow larger until the player finishes the run by crossing the virtual finish line. At the conclusion of the run, a game display may be displayed to the first player that indicates the winner of the run, the winning time, and/or the first player's time (and perhaps splits).

4. Stare Off Game Scenario

In yet another example game scenario, players may compete to stare the longest without blinking. Accordingly, the first HMD may be configured to detect an eye not blinking as a game input and an eye blinking as a game ending input. This game scenario may involve the first player performing a prolonged physical activity (e.g., not blinking).

Figure 8A:
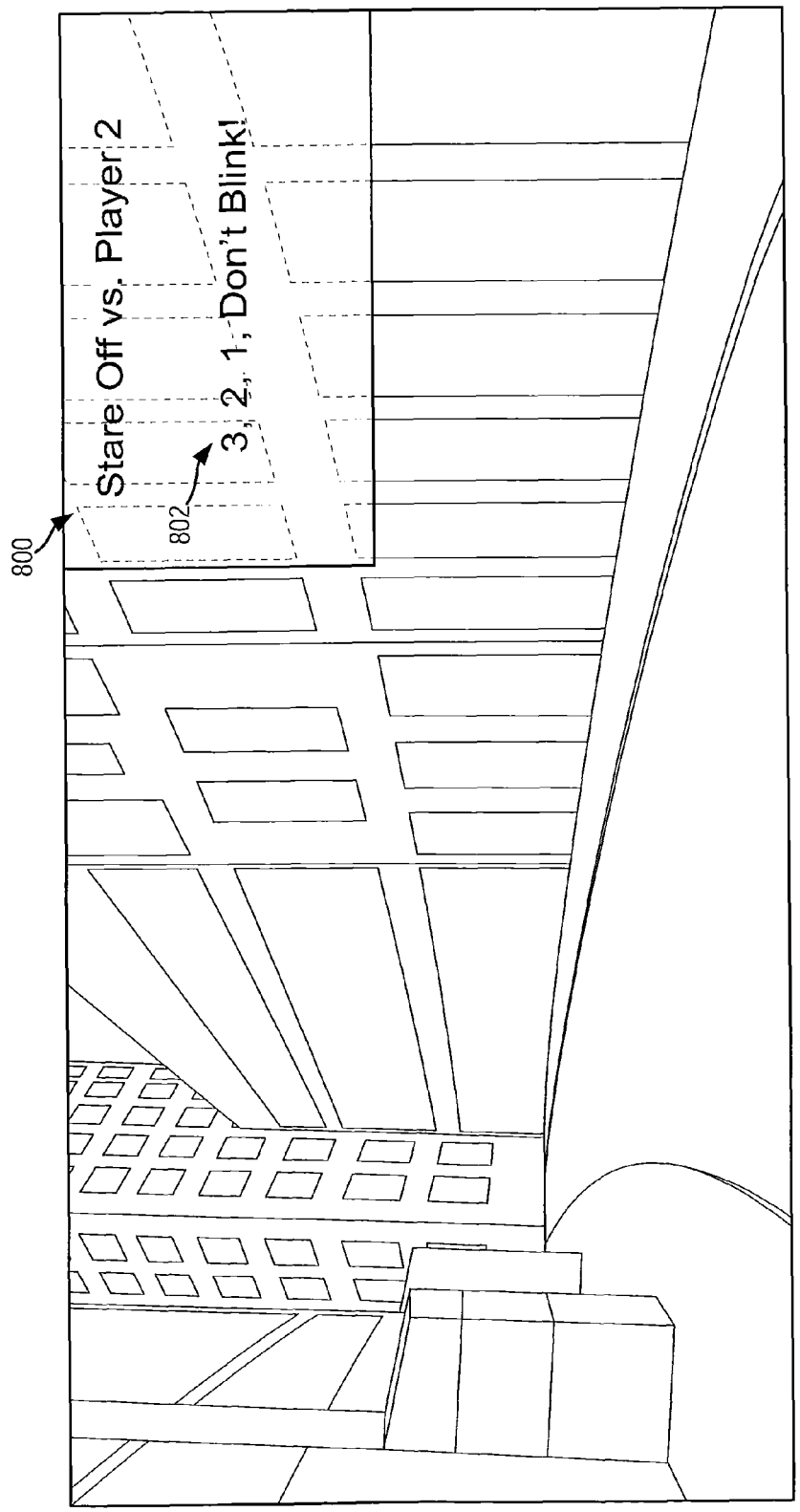
FIG. 8A illustrates an example of a game display displayed to the first player immediately before the players are to begin the stare off.

FIG. 8A illustrates an example of a game display 800 displayed to the first player immediately before the players are to begin the stare off. As shown, the game display 800 includes a game start graphic 802 that may represent a final graphic in a sequence of countdown graphics displayed to the first player.

Figure 8B:
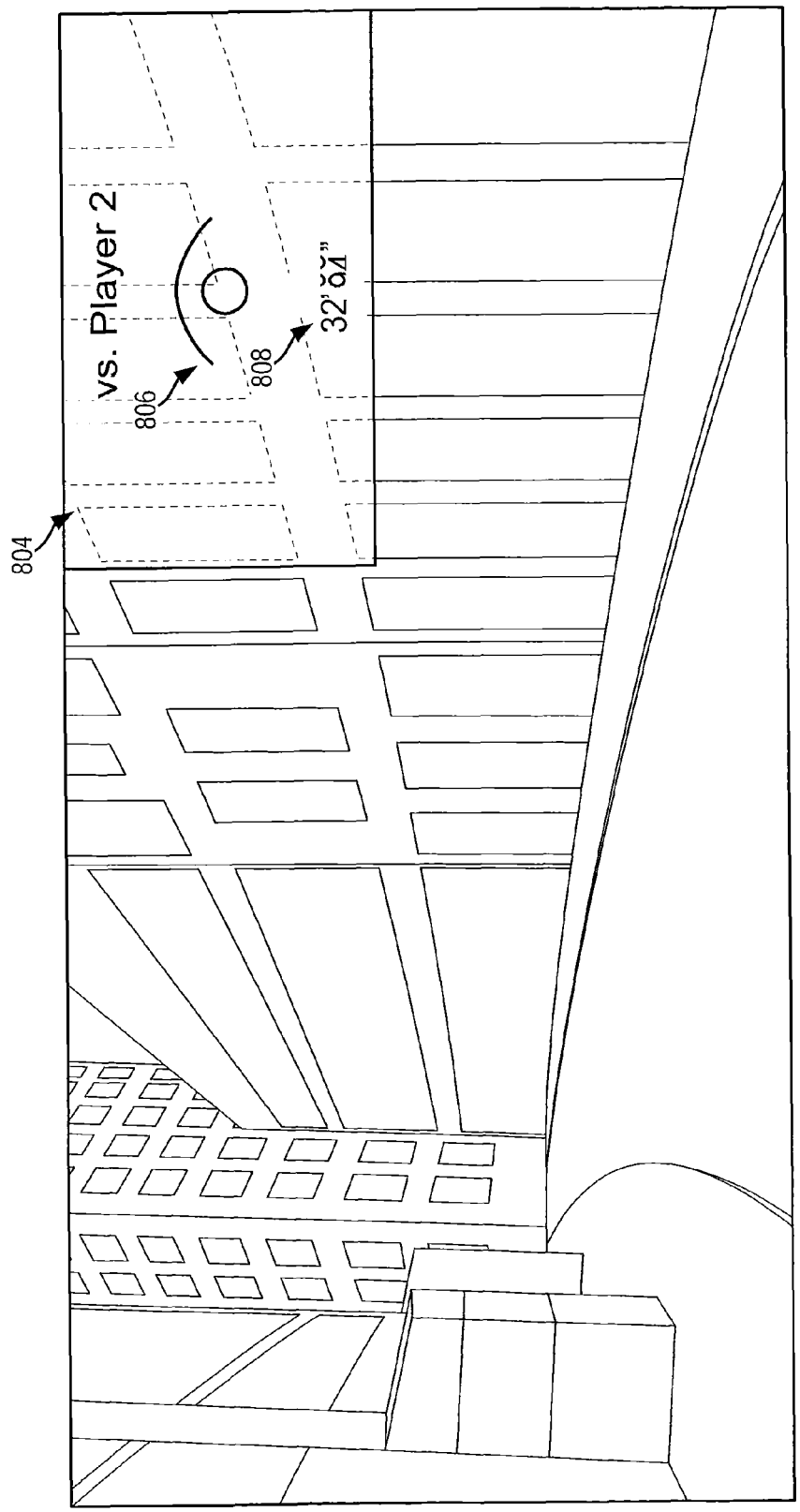
FIG. 8B illustrates an example of a game display displayed to the first player as the players attempt to stare without blinking.

FIG. 8B illustrates an example of a game display 804 displayed to the first player as the players attempt to stare without blinking. As shown, the game display 804 includes a virtual eyeball 806 that corresponds to the second player's eyes, and a timer 808 that indicates an elapsed duration of time during which neither player has blinked.

Figure 8C:
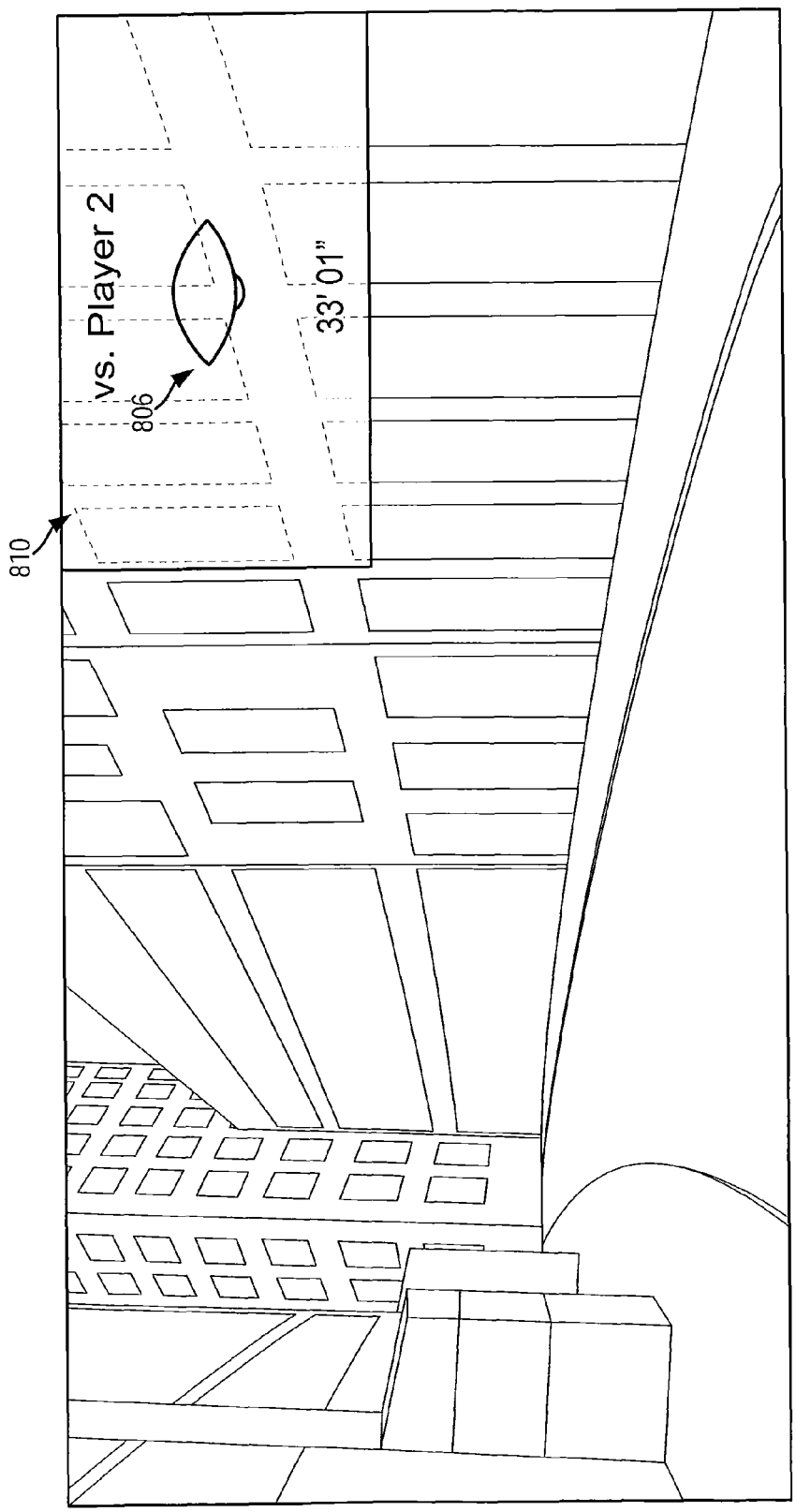
FIG. 8C illustrates an example of a game display displayed to the first player as the second player blinks.

FIG. 8C illustrates an example of a game display 810 displayed to the first player as the second player blinks. As shown, the game display 810 includes the virtual eyeball 806 with a graphical representation of an eye blink. In this example, the first player wins because the second player blinked 33.01 seconds into the round of gameplay.

5. Real-World Snake Game Scenario

A game scenario may involve players playing the classic game of snake. Unlike the classic game of snake, a player's snake tail is defined by the player's real-world movements. For example, a player's snake tail may resemble a trace of where the player walked/ran and perhaps where the player jumped. As a player passes through a virtual target and avoids his/her own tail and his/her competitor's tail, the player may accumulate points and receive a new virtual target. In some implementations, a player may accumulate additional points for running to a virtual target (as opposed to walking) and/or jumping over his/her competitor's tail. In the end, according to certain examples, the first player to run into the other player's tail or a virtual boundary loses. In other examples, the player with the most points may be the winner (which may be the first player to run into the other player's tail).

Accordingly, in this game scenario, the first HMD may be configured to detect a change in the first player's geographical location as a game input. In certain implementations, the first HMD may also be configured to detect the player jumping as a game input. This game scenario may involve the first player performing a prolonged physical activity (e.g., walking or running) and perhaps multiple additional physical actions (e.g., jumping). Notably, this game scenario allows a player to play a real-world version of snake against another player, perhaps located in a different geographical location. In any event, a virtual boundary (e.g., a square, circle, etc. of with predefined dimensions) may be determined and imposed on each player based on their respective initial geographical positions.

Figure 9A:
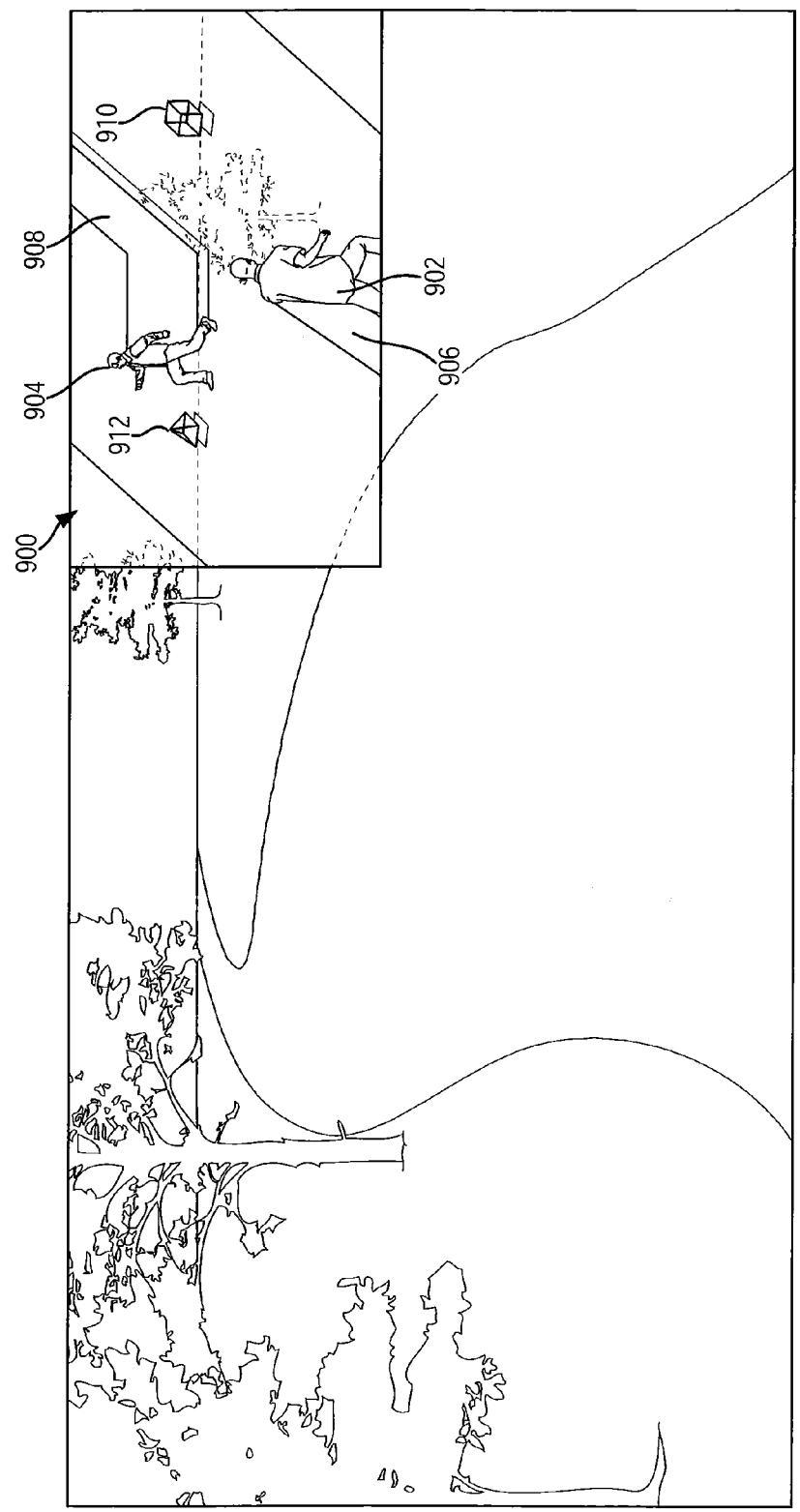
FIG. 9A illustrates an example of a game display displayed to the first player as the players play real-world snake.

FIG. 9A illustrates an example of a game display 900 displayed to the first player as the players play real-world snake. As shown, the game display 900 includes a first virtual player 902 corresponding to the first player, a second virtual player 904 corresponding to the second player, a first virtual tail 906, and a second virtual tail 908. The second virtual player 904 and the second virtual tail 908 provide a graphical representation of the second player's current movements, as the play moves, as well as a trace of the second player's previous movements.

Furthermore, the game display 900 also includes a first player target 910 and a second player target 912. The player targets may display a graphical representation of a real-world location that the respective players have to pass through in order to receive points and a new target. A given real-world location may include a two-dimensional or three-dimensional space. In examples, the given real-world location may be raised off of the ground such that a player has to jump to collect points and receive a new target. Notably, the first and second player targets 910, 912 are displayed as different shapes so that the players know what player the target is intended for.

Figure 9B:
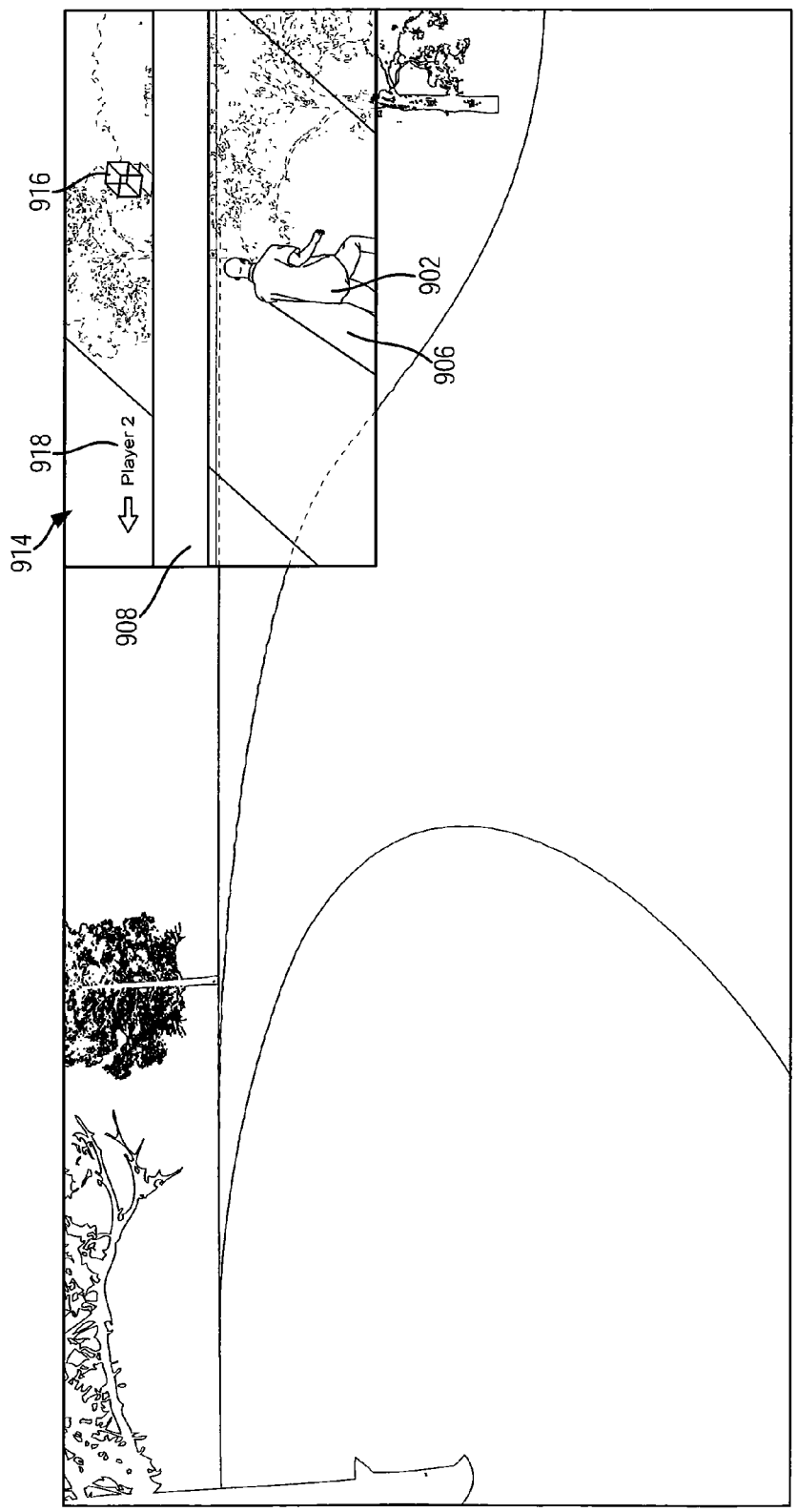
FIG. 9B illustrates an example of a game display displayed to the first player as the first player approaches a first player target and the second virtual tail.

FIG. 9B illustrates an example of a game display 914 displayed to the first player as the first player approaches a first player target 916 and the second virtual tail 908. As shown, the game display 914 includes a second player indicator 918 that notifies the first player of the relative location of the second virtual player. Notably, the second virtual tail 908 obstructs the first player's path to the first player target 916. In traditional snake, the first player would have to navigate his/her snake tail around the second player's tail. In example implementations of real-world snake, the first player may jump in the real-world as he/she approaches the second virtual tail 908 to cause the first virtual player 902 to avoid running into the second virtual tail 908.

Figure 9C:
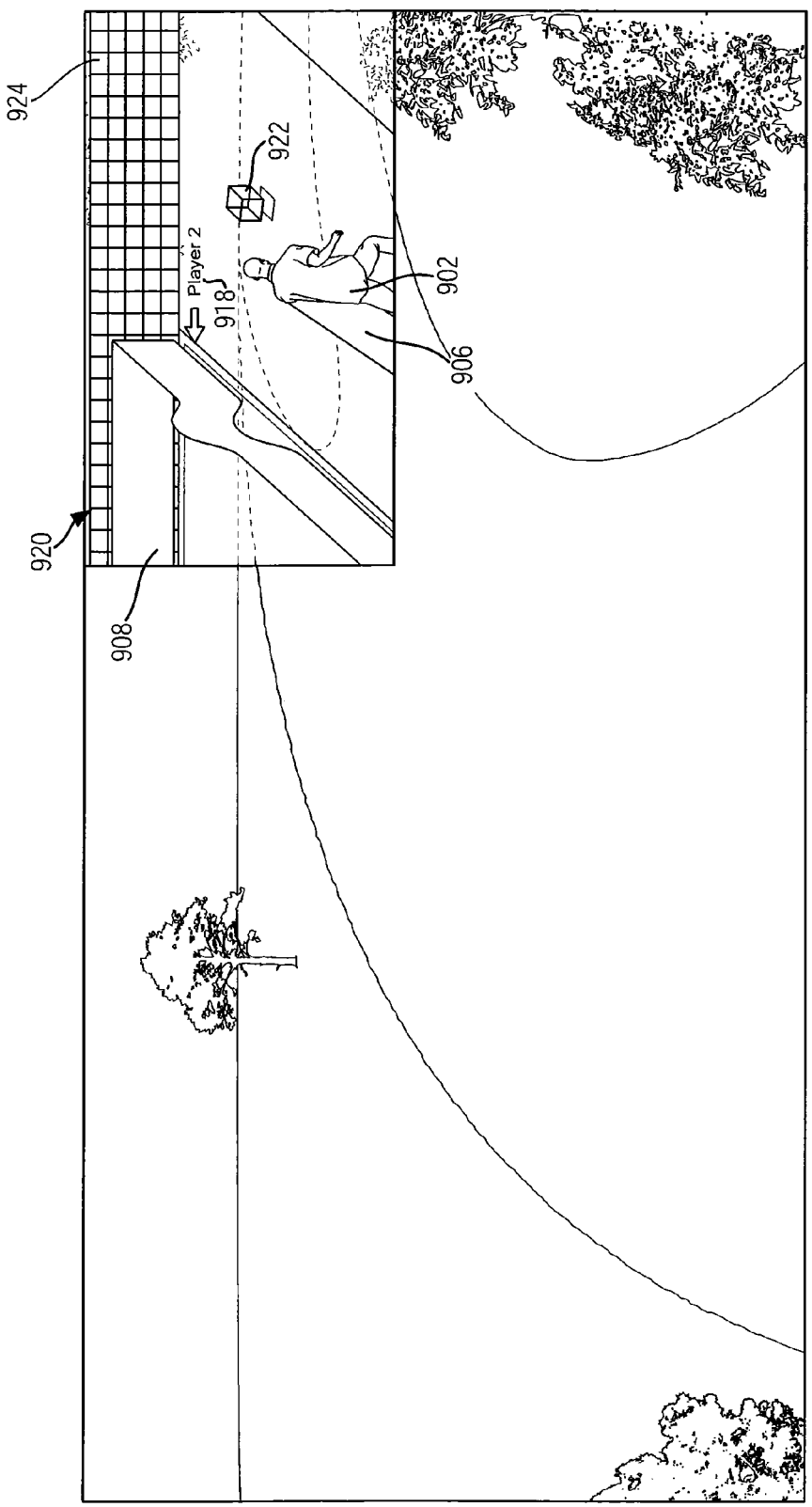
FIG. 9C illustrates an example of a game display displayed to the first player as the first player approaches another first player target.

FIG. 9C illustrates an example of a game display 920 displayed to the first player as the first player approaches another first player target 922. As shown, the game display 920 includes the second virtual tail 908 and the second player indicator 918. Notably, the bump in the second virtual tail 908 indicates that the second player recently jumped thereby causing the second virtual player to jump. Furthermore, the game display 920 includes a boundary graphic 924 indicating that the first player is approaching a virtual boundary.

Figure 9D:
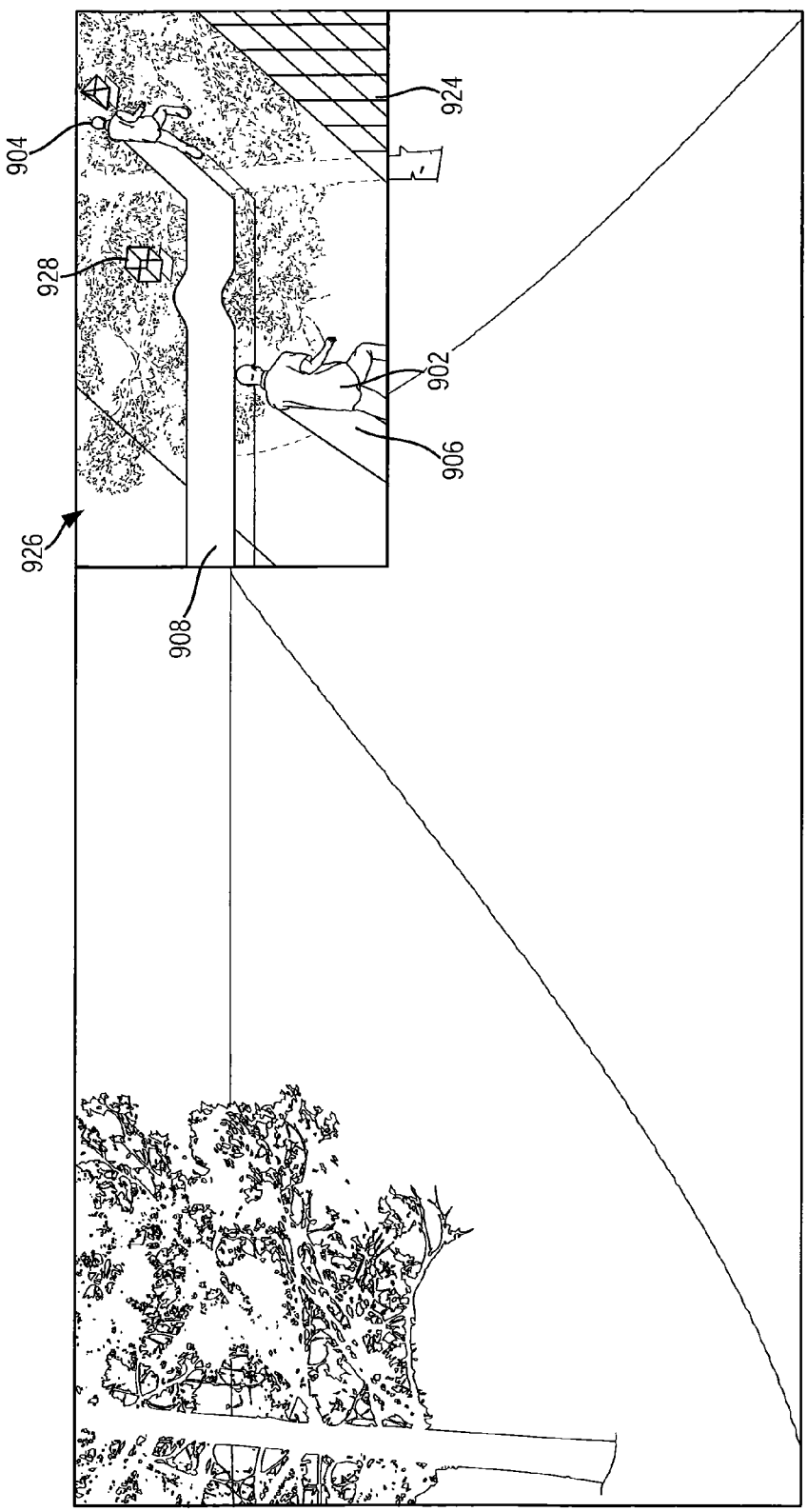
FIG. 9D illustrates an example of a game display displayed to the first player as the first player approaches yet another first player target.

FIG. 9D illustrates an example of a game display 926 displayed to the first player as the first player approaches yet another first player target 928. As shown, the game display includes the second virtual player 904, the second virtual tail 908, and the boundary graphic 924. Notably, the first player target 928 is obstructed by the second virtual tail 908, and to make matters worse for the first player, the obstruction is elevated due to the second player's prior real-world jump.

Figure 9E:
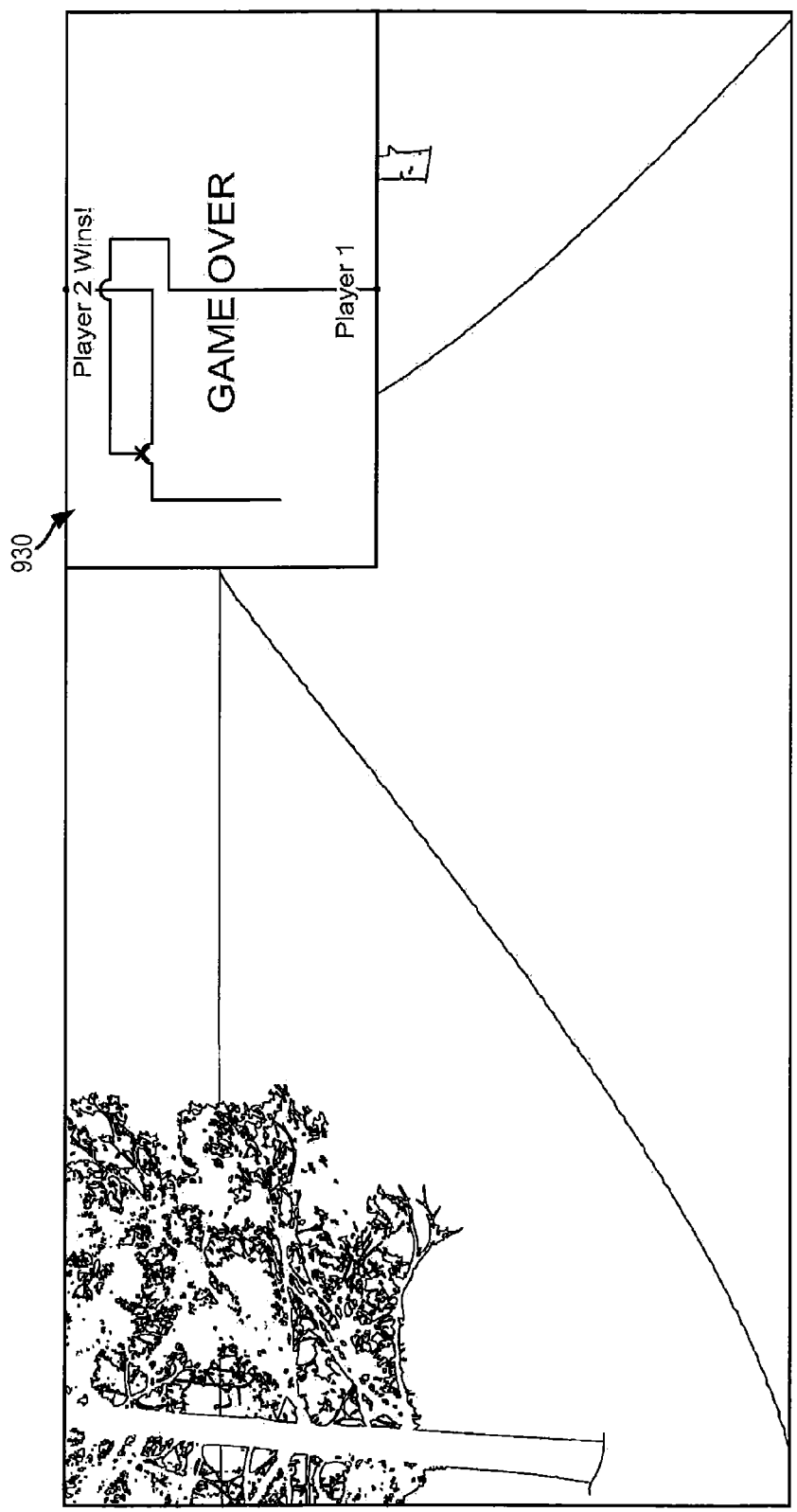
FIG. 9E illustrates an example of a game display displayed to the first player at the end of a round of real-world snake.

FIG. 9E illustrates an example of a game display 930 displayed to the first player at the end of a round of real-world snake. The game display 930 includes a snake-tail summary for each of the players, similar in some respects to a graphic a player might see at the conclusion of a classic game of snake. In this respect, the snake-tail summaries provide a history of each player's respective real-world movements throughout the game. As shown, the first player lost because the first virtual player ran into the second virtual tail, perhaps because the first player did not jump high enough in the real-world to clear the bump in the second virtual tail. Other example game displays are possible as well.

In some examples, the above described game displays may also include a graphical representation of a point total accumulated by the first player and perhaps a graphical indication for the second player's point total. Furthermore, in some implementations, a graphical indication of points may be displayed to the first player, for example, as the first player passes through a target or jumps over the opposing player's snake tail, among other possibilities. Other example displays of points are also possible.

6. Rock, Paper, Scissors Game Scenario

Another example game scenario may involve players playing the classic game of rock, paper, scissors. While the game traditionally involves two players facing one another in person, the game provided herein allows the players to play from different geographical locations. In this game scenario, the first HMD may be configured to capture an image based on detecting a hand gesture or based on a timer and that captured image may be a game input. This game scenario may involve one physical activity (e.g., a single throw of a hand gesture).

Figure 10A:
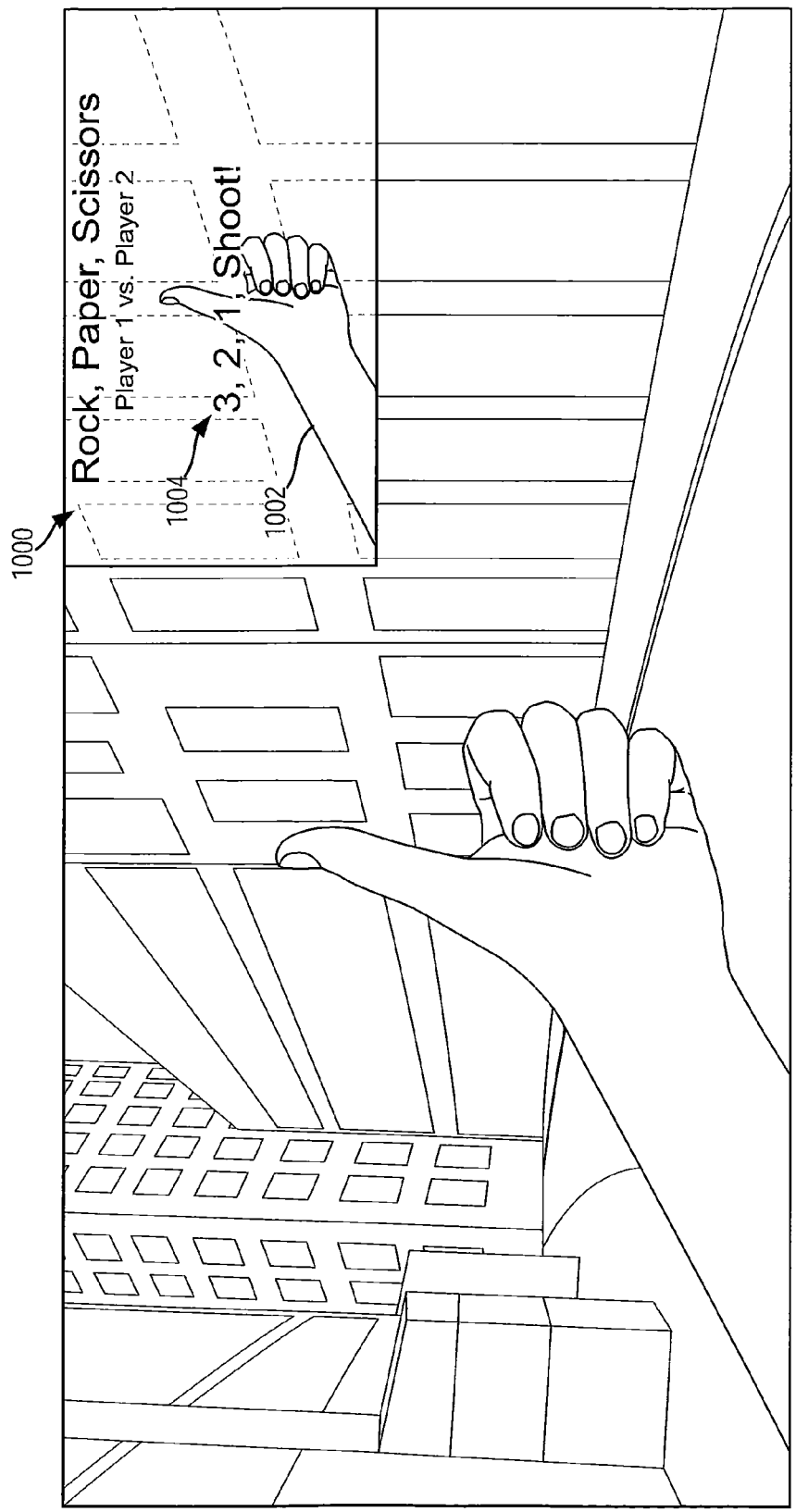
FIG. 10A illustrates an example of a game display displayed to the first player immediately before the players are to throw a rock, paper, or scissor hand gesture.

FIG. 10A illustrates an example of a game display 1000 displayed to the first player immediately before the players are to throw a rock, paper, or scissor hand gesture. As shown, the game display 1000 includes a camera preview of the first player's field of view that includes the first player's hand 1002. The game display 1000 also includes a game start graphic 1004 that may represent a final graphic in a sequence of countdown graphics displayed to the first player. In this way, the game display 1000 may include a real-world camera preview overlaid with game graphics.

Figure 10B:
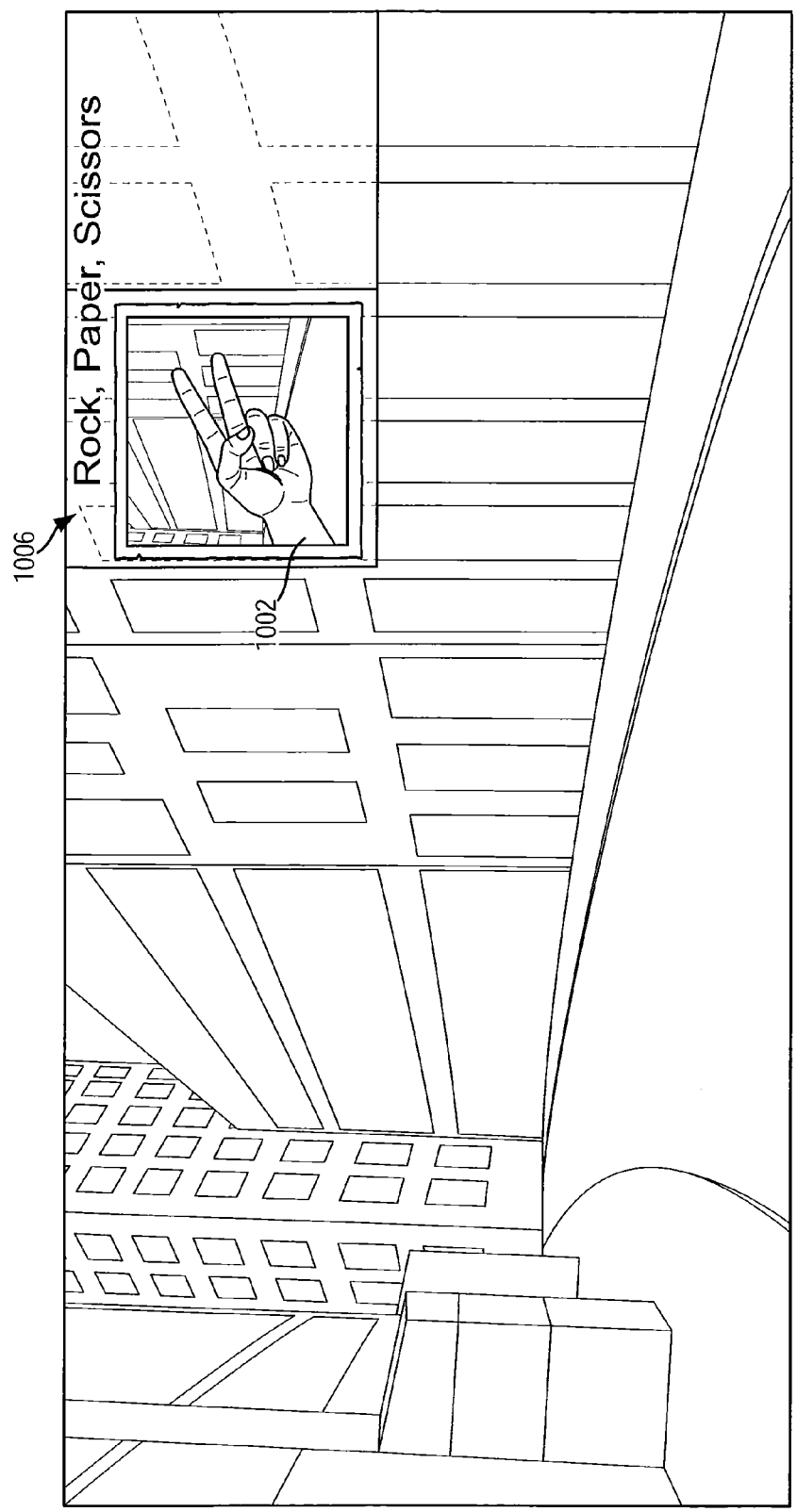
FIG. 10B illustrates an example of a game display displayed to the first player as the player throws the hand gesture.

After the game start graphic 1004 is displayed, the first player may throw his/her hand gesture and the first HMD may capture an image of the thrown hand gesture. FIG. 10B illustrates an example of a game display 1006 displayed to the first player as the player throws the hand gesture. As shown, the game display 1006 includes the first player's hand 1002 performing a scissors hand gesture. The first HMD may responsively capture an image of the hand gesture as shown in the game display 1006 and transmit the captured image to the gaming server.

Figure 10C:
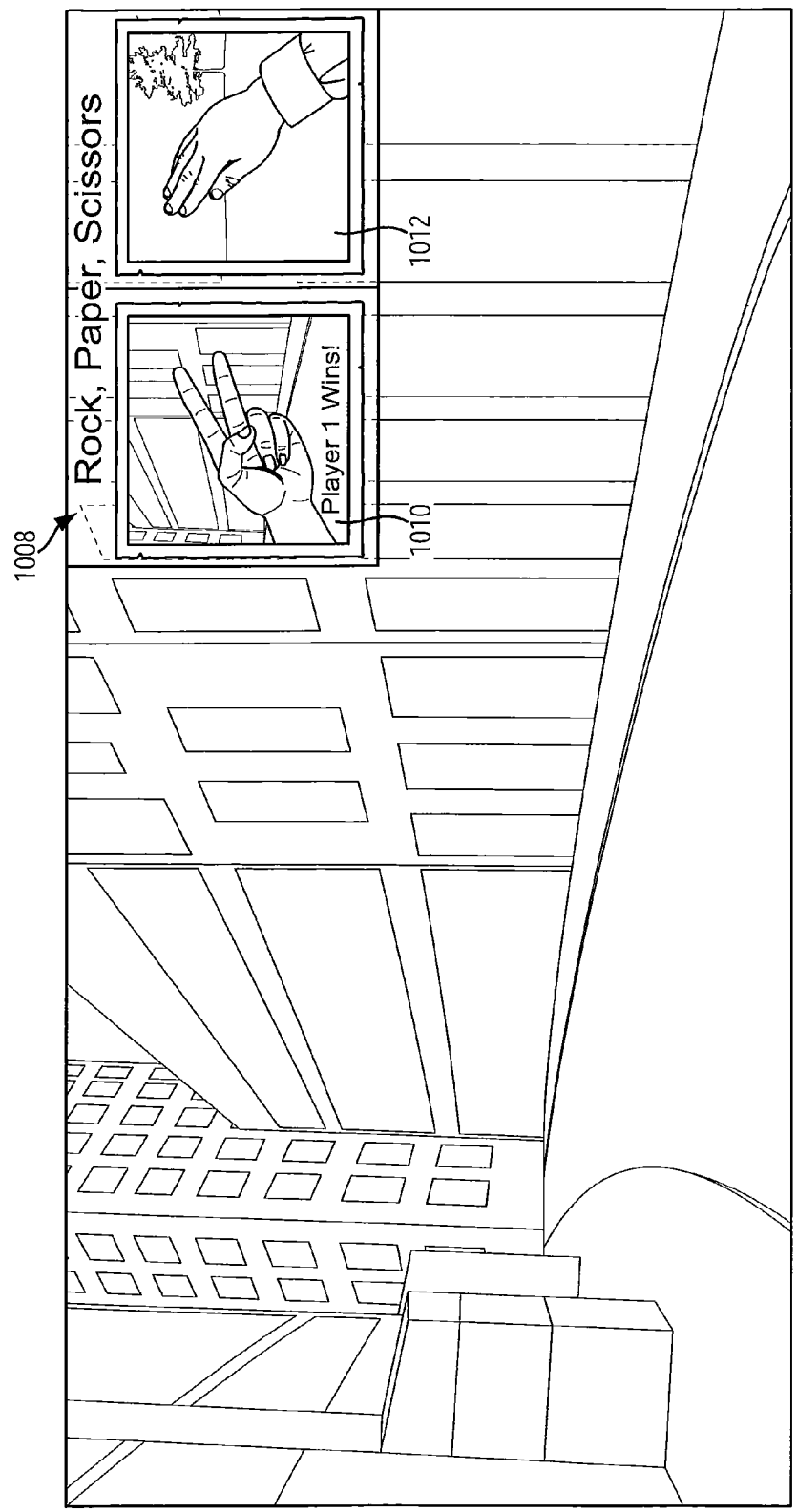
FIG. 10C illustrates an example of a game display displayed to the first player at the conclusion of the round of gameplay.

FIG. 10C illustrates an example of a game display 1008 displayed to the first player at the conclusion of the round of gameplay. As shown, the game display 1008 includes an image of the first player's thrown hand gesture 1010, an image of the second player's thrown hand gesture 1012, and an indication of the winner of the round of gameplay. The gaming server may have determined the winner by performing one or more image recognition processes on the two images to determine what hand gesture is included in each image, and applying the rules of rock, paper, scissors to the determined hand gestures.

7. Ski Racer Game Scenario

Another example game scenario may involve players competing to downhill ski or snowboard a predetermined trail in the fastest time. In this game scenario, the first HMD may be configured to detect a change in the first player's geographical location as a game input. This game scenario may involve the first player performing a prolonged physical activity (e.g., downhill skiing or snowboarding).

In practice, the gaming server, or perhaps a third-party server in communication with the gaming server, may include a database of ski resorts and respective ski trails at a given ski resort. In some examples, the gaming server may provide ski data to the first HMD to allow the first player to select which ski resort he or she is currently skiing at and then which ski trail he or she would like to race on. In other examples, based on location data from the first HMD, the gaming server may determine at which ski resort the first player is currently located and provide a list of ski trails closest to the first player's current location (or perhaps the gaming server may automatically select a ski trail and prompt the first player to approve the selection). After a ski trail is selected, gameplay may progress in a number of different modes.

Figure 11A:
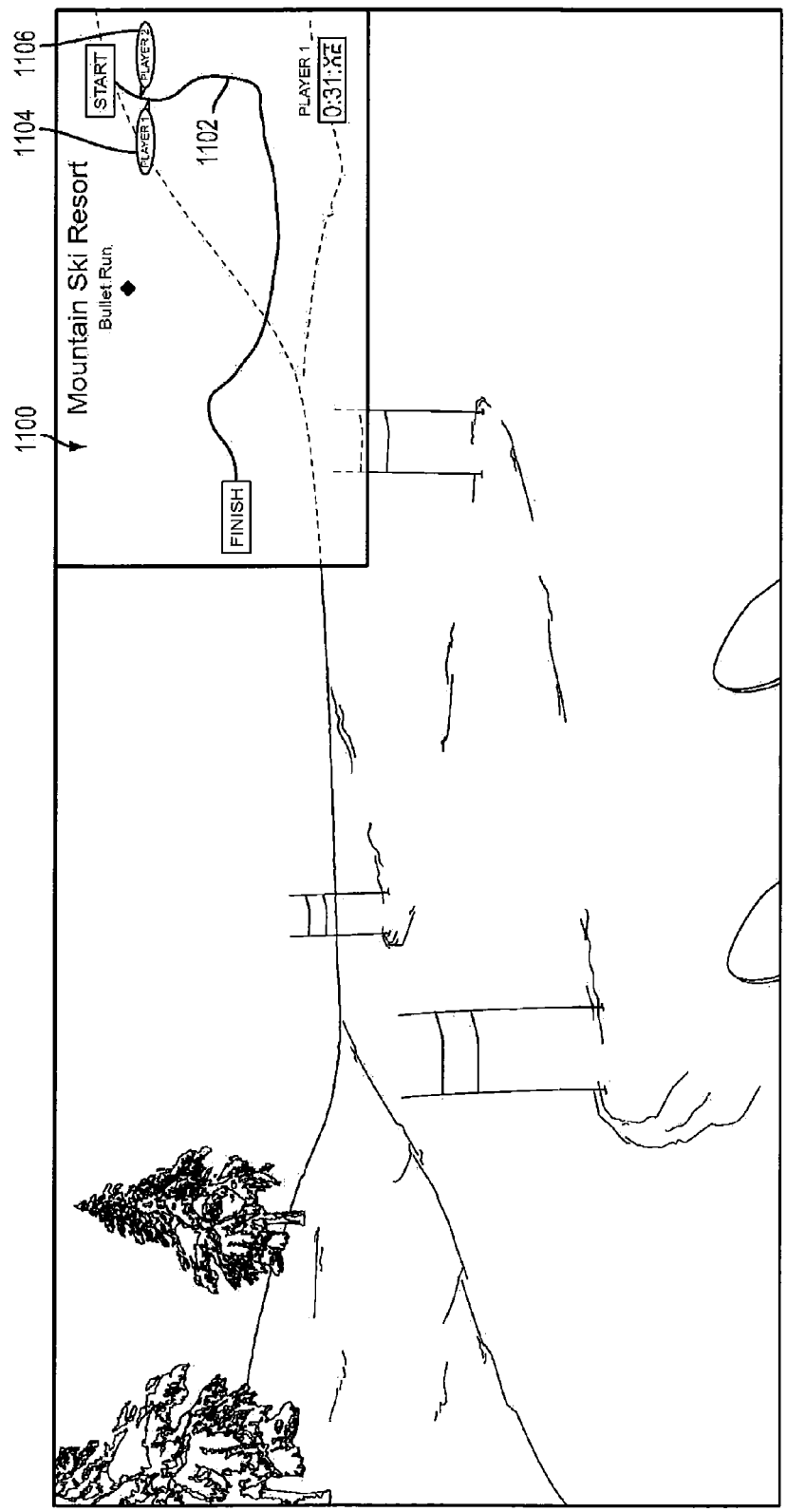
FIG. 11A illustrates an example of a game display displayed to the first player as the players are skiing.

In example implementations of this game scenario, the players may ski the predetermined trail at the same time. A game start graphic may be displayed to the first player, and the first player may then begin to ski (or snowboard). FIG. 11A illustrates an example of a game display 1100 displayed to the first player as the players are skiing. As shown, the game display 1100 includes a trail map 1102 and respective player indicators 1104 and 1106 corresponding to player 1 and player 2, respectively. The trail map 1102 may reflect the contours, as well as other characteristics, of the real-world ski trail that the players are currently skiing. The player indicators 1104 and 1006 indicate the players' relative respective positions on the ski trail.

Figure 11B:
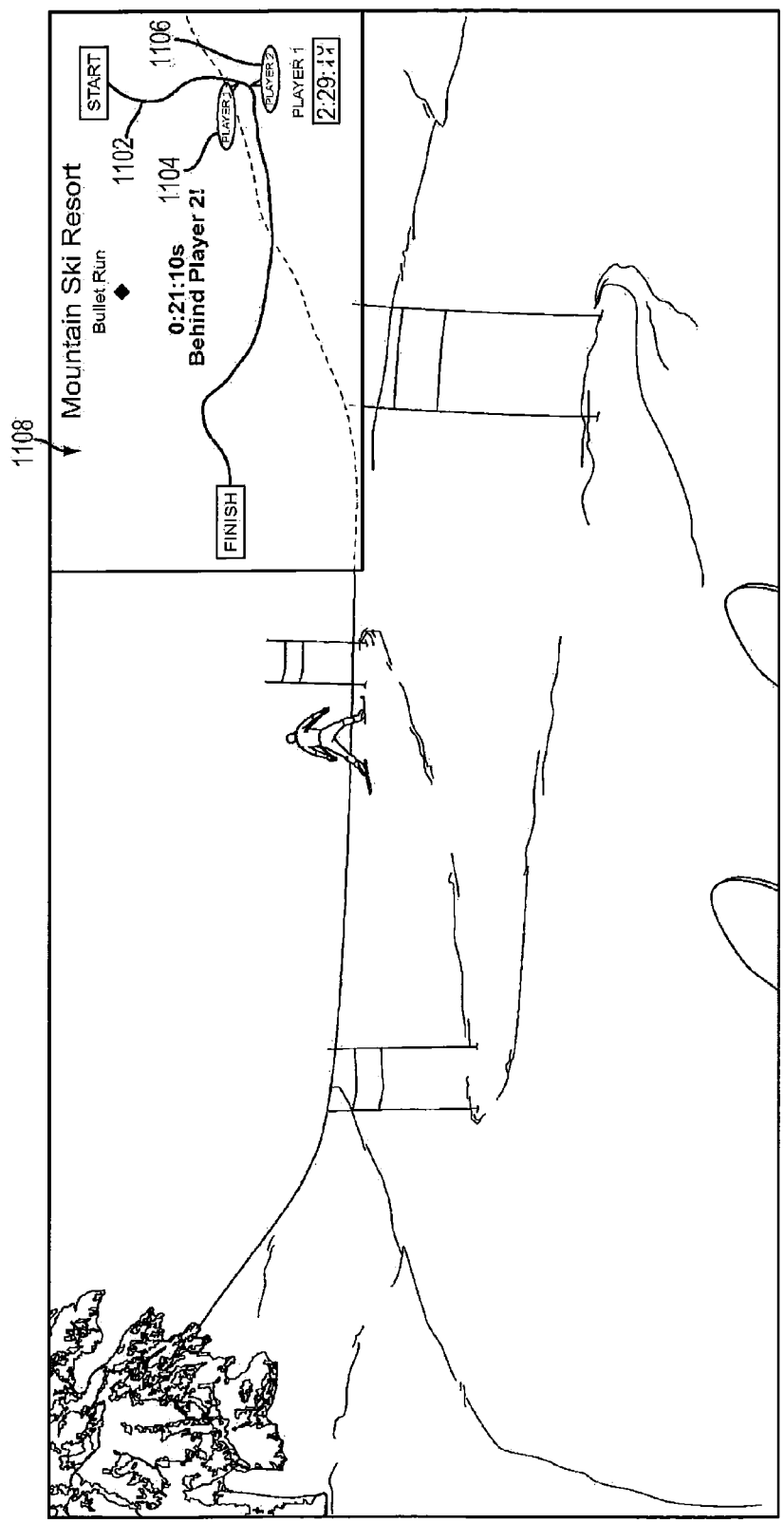
FIG. 11B illustrates an example of a game display displayed to the first player as the players are skiing and the second player is in the lead.

FIG. 11B illustrates an example of a game display 1108 displayed to the first player as the players are skiing and the second player is in the lead. As shown, the game display 1108 includes the player indicator 1106 ahead of the player indicator 1104 indicating that the second player is currently ahead of the first player on the real-world ski trail. As the players continue to ski, game displays similar to FIG. 11B or perhaps game displays similar in some respects to those of FIGS. 7A-7D may be displayed to the first player as the first player skis the trail. When the first player finishes skiing the trail, a final game display displayed to the first player may include a leaderboard that shows the times of each player from the just finished race. In other examples, the leaderboard may show leading times for the particular trail over the past day, week, month, year, all-time, etc. Other examples are also possible.

In other example implementations, the players may ski the predetermined trail one at a time. In such implementations, assuming that the second player skied before the first player, as the first player skis, a game display displayed to the first player may include a virtual second player that provides a graphical representation of the second player skiing the trail. In this way, the first player may be the only skier on the path, but he/she will have the experience of skiing against another player.

In yet other implementations of this game scenario, the players may ski the predetermined trail with staggered start times. For example, the second player may begin skiing the trail and then the first player may begin skiing the trail a predetermined duration of time after the second player. In this way, multiple players may navigate the trail at the same time, and the staggered start times may promote safety. In such implementations, the first player may begin skiing with a game display that includes a virtual second player that provides a graphical representation of the second player skiing the path moments before. In some contexts, the first player may eventually pass the virtual second player and in doing so, the real-world second player may come into the field of view of the first HMD. The first HMD may detect the second player and may cause a different game display, perhaps showing a real-world view overlaid with game graphics, to be displayed to the first player. In any event, at the end of the game (e.g., after each player has finished skiing the path), the total time taken by each player to complete the path may be compared to determine the winner.

Those of ordinary skill in the art will appreciate that these are but a few examples of possible implementations of a multi-player game. Other examples are possible as well, and the specific details of how the multi-player game progresses are not critical to the embodiments described herein.

V. Conclusion

In the figures, similar symbols typically identify similar components, unless context indicates otherwise. The illustrative embodiments described in the detailed description, figures, and claims are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block and/or communication may represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages may be executed out of order from that shown or discussed, including in substantially concurrent or in reverse order, depending on the functionality involved. Further, more or fewer steps, blocks and/or functions may be used with any of the message flow diagrams, scenarios, and flow charts discussed herein, and these message flow diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, or a tangible storage device.

Moreover, a step or block that represents one or more information transmissions may correspond to information transmissions between software and/or hardware modules in the same physical device. However, other information transmissions may be between software modules and/or hardware modules in different physical devices.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may haw control over how information is collected about the user and used by a content server.

We claim:

1. A method comprising:
   initiating, by a computing system, a game application that provides a game comprising one or more rounds of gameplay; and
   during each of the one or more rounds of gameplay:
   determining a particular physical activity to be performed at both a first head-mountable device (HMD) and a second HMD at substantially the same time, during the given round of gameplay, wherein the particular physical activity for the given round comprises a stare action;
   receiving first body-movement data corresponding to body movement during performance of the stare action at the first HMD;
   receiving second body-movement data corresponding to body movement during performance of the stare action at the second HMD; and
   during receipt of both the first body-movement data and the second body-movement data:
   based on the first body-movement data and the second body-movement data, the computing system generating, in real-time: (a) first competitor data indicating a duration of the stare action as performed at the second HMD and (b) second competitor data indicating a duration of the stare action as performed at the first HMD; and
   transmitting the first competitor data to the first HMD in real-time to facilitate real-time display, by the first HMD, of the graphical representation of the stare action as performed at the second HMD;
   based on a comparison of the durations of the stare action as performed at the first and second HMDs, generating game result data; and
   transmitting the game result data to the first HMD.

2. The method of claim 1, further comprising, during each of the one or more rounds of gameplay:
   transmitting to the second HMD the second competitor data to facilitate display of the graphical representation of the body movement associated with the first HMD by the second HMD.

3. The method of claim 1, wherein the game comprises at least a first round of gameplay, the method further comprising:
   before the first round of gameplay, receiving: (a) first initialization data indicating an initial body state associated with the first HMD and (b) second initialization data indicating an initial body state associated with the second HMD.

4. The method of claim 1, the method further comprising:
   transmitting to the first HMD and the second HMD game-start data to facilitate substantially simultaneous display of a graphical representation of a start of the game by the first HMD and the second HMD.

5. The method of claim 1, wherein the particular physical activity for a given round further comprises a jump action, and wherein transmitting the first competitor data to the first HMD in real-time further comprises:
   transmitting jump height data to the first HMD in real-time to facilitate real-time display, by the first HMD, of the graphical representation of the performance of the jump action at the second HMD.

6. The method of claim 5, wherein generating the game result data further comprises:
   determining, based on the body-movement data associated with the first HMD, a first jump height corresponding performance of the jump action at the first HMD;
   determining, based on the body-movement data associated with the second HMD, a second jump height corresponding performance of the jump action at the second HMD;
   comparing the first jump height to the second jump height; and
   generating game result data corresponding to the comparison of the first jump height to the second jump height.

7. The method of claim 1, wherein generating the game result data comprises:
   determining, based on the body-movement data associated with the first HMD, a first stare duration indicating a duration of the stare action at the first HMD;
   determining, based on the body-movement data associated with the second HMD, a second stare duration corresponding performance of a corresponding stare action at the second HMD;
   comparing the first stare duration to the second stare duration; and
   generating game result data corresponding to the comparison of the first stare duration to the second stare duration.

8. A computing system comprising:
   a network interface, wherein the network interface communicatively couples the computing system to a first head-mountable device (HMD) and a second HMD;
   a non-transitory computer-readable medium; and
   program instructions stored on the non-transitory computer-readable medium and executable by at least one processor to cause the computing system to:
   initiate a game application that provides a game comprising one or more rounds of gameplay; and
   during each of the one or more rounds of gameplay:
   determine a particular physical activity to be performed at both a first head-mountable device (HMD) and a second HMD at substantially the same time, during the given round of gameplay, wherein the particular physical activity for the given round comprises a stare action;
   receive first body-movement data corresponding to body movement during performance of the stare action at the first HMD;
   receive second body-movement data corresponding to body movement during performance of the stare action at the second HMD; and
   during receipt of the first body-movement data and the second body-movement data:
   (i) based on the first body-movement data and the second body-movement data, generate, in real-time: (a) first competitor data indicating a duration of the stare action as performed at the second HMD and (b) second competitor data indicating a duration of the stare action as performed at the first HMD; and
   (ii) transmit the first competitor data to the first HMD in real-time to facilitate real-time display, by the first HMD, of the graphical representation of the stare action as performed at the second HMD; and based on a comparison of the durations of the stare action as performed at the first and second HMDs, generate game result data; and transmit the game result data to the first HMD.

9. The computing system of claim 8, wherein the program instructions are executable by the at least one processor to further cause the computing system to:

transmit to the second HMD the second competitor data to facilitate display of the graphical representation of the body movement associated with the first HMD by the second HMD.

10. The computing system of claim 8, wherein the program instructions are executable by the at least one processor to further cause the computing system to:

transmit to the first HMD and the second HMD game-start data to facilitate substantially simultaneous display of a graphical representation of a start of the game by the first HMD and the second HMD.

11. A method comprising:

initiating, by a first head-mountable device (HMD), a game application that provides a game comprising one or more rounds of gameplay; and during each of the one or more rounds of gameplay:
    determining a particular physical activity to be performed at both the first HMD)\and a second HMD at substantially the same time, during the given round of gameplay, wherein the particular physical activity for the given round comprises a stare action;
    transmitting to a computing system first body-movement data corresponding to body movement during performance of the stare action at the first HMD;
    receiving competitor data indicating a graphical representation of body movement during performance of the stare action at the second HMD, wherein the competitor data is based on a duration of the stare action as performed at the second HMD;
    based on the received competitor data, causing a graphical display to display in real-time, substantially concurrent with the transmission of the first body-movement data, the graphical representation of the stare action as performed at the second HMD;
    determining game result data, wherein the game result data is based on a comparison of a duration of the stare action as performed at the first HMD to the duration of the stare action as performed at the second HMD; and
    displaying the game result data on the graphical display of the first HMD.

12. The method of claim 11, further comprising, during each of the one or more rounds of gameplay:
    determining the first body-movement data, wherein determining the first body-movement data comprises determining the first body-movement data using at least one of a camera, a microphone, an accelerometer, a gyroscope, a GPS sensor, or a proximity sensor.

13. The method of claim 11, further comprising, during each of the one or more rounds of gameplay:
    based on the determined first body-movement data, causing the graphical display to display a graphical representation of the body movement associated with the first HMD.

14. The method of claim 11, wherein causing the graphical display to display the graphical representation of the body movement associated with the second HMD comprises displaying the graphical representation of the body movement associated with the second HMD at substantially the same time as the body movement occurs.

15. The method of claim 11, further comprising, during each of the one or more rounds of gameplay:
    receiving game-result data indicating a game result.

16. The method of claim 15, further comprising, during each of the one or more rounds of gameplay:
    based on the received game-result data, causing the graphical display to display a graphical representation of the game result.

17. A head-mountable device (HMD) comprising:
a graphical display;
a network interface, wherein the network interface communicatively couples the HMD to a computing system;
a non-transitory computer-readable medium; and
program instructions stored on the non-transitory computer-readable medium and executable by at least one processor to cause the HMD to:
    initiate a game application that provides a game comprising one or more rounds of gameplay; and
    during each of the one or more rounds of gameplay:
        determine a particular physical activity to be performed at both the first HMD) and a second HMD at substantially the same time, during the given round of gameplay, wherein the particular physical activity for the given round comprises a stare action;
        transmit to a computing system first body-movement data corresponding to body movement during performance of the stare action at the first HMD;
        receive competitor data indicating a graphical representation of body movement during performance of the stare action at the second HMD;
        based on the received competitor data, cause the graphical display to display in real-time, substantially concurrent with the transmission of the first body-movement data, the graphical representation of the body movement associated with the performance of the stare action as performed at the second HMD;
        determine game result data, wherein the game result data is based on a comparison of a duration of the stare action as performed at the first HMD to the duration of the stare action as performed at the second HMD; and
        display the game result data on the graphical display.

18. The HMD of claim 17, wherein the program instructions are executable by the at least one processor to further cause the HMD to, during each of the one or more rounds of gameplay:
    determine the first body-movement data, wherein determining the first body-movement data comprises determining the first body-movement data using at least one of a camera, a microphone, an accelerometer, a gyroscope, a GPS sensor, or a proximity sensor.

19. The HMD of claim 18, wherein the program instructions are executable by the at least one processor to further cause the HMD to, during each of the one or more rounds of gameplay:
    based on the determined first body-movement data, cause the graphical display to display a graphical representation of the body movement associated with the HMD.

20. The HMD of claim 17, wherein the program instructions are executable by the at least one processor to further cause the HMD to, during each of the one or more rounds of gameplay:
    based on game-result data indicating a game result, cause the graphical display to display a graphical representation of the game result.

21. The HMD of claim 17, wherein causing the graphical display to display the graphical representation of the body movement associated with the additional HMD comprises displaying the graphical representation of the body movement associated with the additional HMD at substantially the same time as the body movement occurs.

\* \* \* \* \*